(12) United States Patent
Zhang

(10) Patent No.: US 9,661,562 B2
(45) Date of Patent: May 23, 2017

(54) ACCESS METHOD AND APPARATUS IN HETEROGENEOUS NETWORK

(71) Applicant: Huawei Technologies Co., Ltd., Shenzhen (CN)

(72) Inventor: Yingyu Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 123 days.

(21) Appl. No.: 14/618,592

(22) Filed: Feb. 10, 2015

(65) Prior Publication Data
US 2015/0163730 A1 Jun. 11, 2015

Related U.S. Application Data

(63) Continuation of application No. PCT/CN2013/081205, filed on Aug. 9, 2013.

(30) Foreign Application Priority Data

Aug. 10, 2012 (CN) .......................... 2012 1 0284929

(51) Int. Cl.
*H04W 48/16* (2009.01)
*H04W 48/12* (2009.01)
(Continued)

(52) U.S. Cl.
CPC .......... *H04W 48/16* (2013.01); *H04W 48/12* (2013.01); *H04W 74/0833* (2013.01); *H04W 84/045* (2013.01)

(58) Field of Classification Search
None
See application file for complete search history.

(56) References Cited

U.S. PATENT DOCUMENTS 5,521,910 A * 5/1996 Matthews ........... H04L 12/5602
370/256
5,790,546 A * 8/1998 Dobbins ............. H04L 12/5602
370/392
(Continued)

FOREIGN PATENT DOCUMENTS

CN 101827380 A 9/2010
CN 101860876 A 10/2010
(Continued)

OTHER PUBLICATIONS

"3rd Generation Partnership Project; Technical Specification Group Radio Access Network; Coordinated multi-point operation for LTE physical layer aspects (Release 11)," 3GPP TR 36.819, V11.1.0, Dec. 2011, 69 pages.
(Continued)

*Primary Examiner* — Ayaz Sheikh
*Assistant Examiner* — Faiyazkhan Ghafoerkhan
(74) *Attorney, Agent, or Firm* — Kilpatrick Townsend & Stockton LLP

(57) ABSTRACT

Embodiments of the present invention provide an access method and apparatus in a heterogeneous network. The access method in a heterogeneous network include broadcasting a system message to a user equipment. The system message includes configuration information of a cell access port and configuration information of at least one group of hot spot access port, so that the user equipment accesses the cell access port or a hot spot access port according to the system information. The heterogeneous network includes at least one hot spot access port, the at least one hot spot access port is grouped into at least one group, and each group of hot spot access port includes at least one hot spot access port.

18 Claims, 6 Drawing Sheets

(51) Int. Cl.
*H04W 84/04* (2009.01)
*H04W 74/08* (2009.01)

(56) References Cited

U.S. PATENT DOCUMENTS

| | | | | | |
|---|---|---|---|---|---|
| 6,331,983 | B1* | 12/2001 | Haggerty | ............. | H04L 12/185 370/400 |
| 8,923,244 | B2* | 12/2014 | Tinnakornsrisuphap | ................. | H04W 36/04 370/331 |
| 2005/0288021 | A1* | 12/2005 | Hunkeler | ............. | H04W 48/10 455/436 |
| 2009/0264118 | A1* | 10/2009 | Robson | ................ | H04W 24/00 455/423 |
| 2010/0040023 | A1* | 2/2010 | Gallagher | ............... | H04W 8/02 370/331 |
| 2010/0041387 | A1* | 2/2010 | Khetawat | ................ | H04W 8/02 455/422.1 |
| 2010/0041402 | A1* | 2/2010 | Gallagher | ............... | H04W 8/02 455/435.1 |
| 2010/0041403 | A1* | 2/2010 | Khetawat | ................ | H04W 8/02 455/435.1 |
| 2010/0041405 | A1* | 2/2010 | Gallagher | ............... | H04W 8/02 455/436 |
| 2010/0142485 | A1* | 6/2010 | Lee | ....................... | H04W 36/02 370/331 |
| 2010/0178920 | A1* | 7/2010 | Kitazoe | ............ | H04W 36/0055 455/436 |
| 2010/0240367 | A1* | 9/2010 | Lee | ................... | H04W 36/0077 455/435.2 |
| 2010/0330988 | A1* | 12/2010 | Granlund | .............. | H04W 48/10 455/434 |
| 2011/0021240 | A1* | 1/2011 | Hiltunen | .............. | H04J 11/0086 455/522 |
| 2011/0039558 | A1* | 2/2011 | Lee | ....................... | H04W 48/20 455/434 |
| 2011/0183676 | A1* | 7/2011 | Lee | ................... | H04W 36/0072 455/438 |
| 2011/0194530 | A1* | 8/2011 | Tinnakornsrisuphap | ................... | H04W 36/04 370/331 |
| 2011/0206009 | A1* | 8/2011 | Attar | ................ | H04W 36/0061 370/331 |
| 2012/0069800 | A1* | 3/2012 | Soliman | ................ | H04W 48/08 370/329 |
| 2012/0115532 | A1* | 5/2012 | He | ....................... | H04W 52/50 455/522 |
| 2012/0144226 | A1* | 6/2012 | Yang | .................. | H04L 41/0672 714/2 |
| 2012/0183028 | A1* | 7/2012 | Han | ...................... | H04B 7/022 375/222 |
| 2012/0281679 | A1* | 11/2012 | Fan | ..................... | H04W 74/008 370/336 |
| 2013/0114576 | A1* | 5/2013 | Kwon | .................... | H04L 5/001 370/336 |
| 2013/0295915 | A1* | 11/2013 | Nakamata | ......... | H04W 36/0083 455/422.1 |
| 2013/0337797 | A1* | 12/2013 | Ban | ....................... | H04W 84/00 455/422.1 |
| 2014/0036870 | A1* | 2/2014 | Skov | ................ | H04W 36/0088 370/331 |
| 2014/0044051 | A1* | 2/2014 | Kamalaraj | ............ | H04W 8/065 370/328 |
| 2014/0313969 | A1* | 10/2014 | Kalhan | ............. | H04W 36/0072 370/312 |
| 2015/0223212 | A1* | 8/2015 | Der Velde | ............. | H04L 5/0032 370/329 |
| 2015/0312811 | A1* | 10/2015 | Lei | ......................... | H04W 36/38 370/331 |
| 2016/0037562 | A1* | 2/2016 | Kim | .................. | H04W 74/0833 370/329 |
| 2016/0081021 | A1* | 3/2016 | Abdel-Samad | ... | H04W 52/0209 370/311 |
| 2016/0157147 | A1* | 6/2016 | Saghir | ................... | H04W 36/04 455/444 |

FOREIGN PATENT DOCUMENTS

CN 102474778 A 5/2012
KR 1020080000200 A 1/2008

OTHER PUBLICATIONS

3rd Generation Partnership Project; Technical Specification Group Radio Access Network; Evolved Universal Terrestrial Radio Access (E-UTRA); Physical Channels and Modulation (Release 10), 3GPP TS 36.211, V10.5.0, Jun. 2012, 101 pages.

3rd Generation Partnership Project; Technical Specification Group Radio Access Network; Evolved Universal Terrestrial Radio Access (E-UTRA); Physical layer procedures (Release 10), 3GPP TS 36.213, V10.3.0, Sep. 2011, 122 pages.

3rd Generation Partnership Project; Technical Specification Group Radio Access Network; Evolved Universal Terrestrial Radio Access (E-UTRA); Physical layer; Measurements (Release 10), 3GPP TS 36.214, V10.1.0, Mar. 2011, 13 pages.

Nokia (Rapporteur), "System Information Classification," 3GPP TSG-RAN WG2 Meeting #56, R2-063077, Agenda Item: 11.2.5, Nov. 6-10, 2006, 7 pages.

* cited by examiner

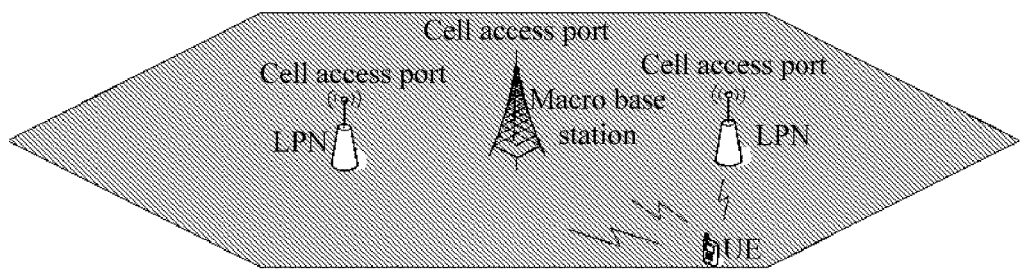
FIG. 1(a)
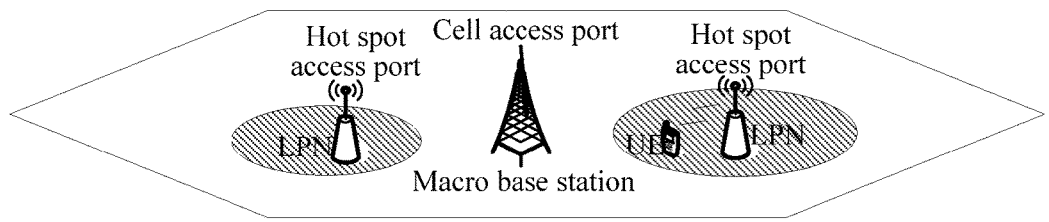
FIG. 1(b)
| 101. A UE receives a system message, where the system message includes configuration information of a cell access port and configuration information of at least one group of hot spot access port |
|---|
| 102. The UE accesses the cell access port or a hot spot access port according to system information |
|---|
FIG. 2

401. A UE receives a system message, where the system message includes configuration information of a cell access port and configuration information of at least one group of hot spot access port, the configuration information of the at least one group of hot spot access port includes list information of a port in a port group and access threshold information of each hot spot access port in a list of the port in the port group, and the access threshold information includes a transmission path loss threshold and a strength threshold 402. The UE measures a transmission path loss between the UE and a hot spot access port in the list of the port in the port group and reception strength of a downlink reference signal between the UE and a hot spot access port in the list of the port in the port group according to system information 403. The UE selects an uplink access port and a downlink access port according to a result of the measurement 404. The UE acquires a physical random access channel configuration of the selected downlink access port and a random access sequence configuration of the selected uplink access port from the system information 405. The UE sends a random access request by using the random access sequence configuration of the selected uplink access port and the physical random access channel configuration of the selected downlink access port 406. The UE receives a random access response from the selected downlink access port 407. The UE sends an RRC link setup request to the selected uplink access port, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port 408. The UE receives RRC link configuration information from the selected downlink access port, where the RRC link configuration information includes hot spot access port configuration information, and the hot spot access port configuration information indicates a hot spot access port that serves the UE

FIG. 5

ACCESS METHOD AND APPARATUS IN HETEROGENEOUS NETWORK

This application is a continuation of International Application No. PCT/CN2013/081205, filed on Aug. 9, 2013, which claims priority to Chinese Patent Application No. 201210284929.2, filed on Aug. 10, 2012, both of which are hereby incorporated by reference in their entireties.

TECHNICAL FIELD

The present invention relates to the field of communications technologies, and in particular, to an access method and apparatus in a heterogeneous network.

BACKGROUND

With the development of communications technologies, a new type of network deployment, that is, a heterogeneous network Het-Net (Heterogeneous Network), is gradually introduced to a wireless network. A core of a heterogeneous network technology is that, a certain quantity of low power nodes LPNs (Low Power Node) are deployed within coverage of a macro base station, so as to increase available spectrum resources by using a cell splitting technology or a spectrum reuse technology, thereby improving a throughput of a unit geographical area.

Compared with the macro base station, an LPN has relatively low downlink total transmit power; therefore, coverage of the LPN is smaller. In the prior art, there may be two manners for deploying an LPN in a Het-Net. The first manner may be referred to as a D-PCI (different physical cell identifier) manner, where the LPN may be considered as a port that has a different cell identity ID (identity) from that of the macro base station, and the LPN has all base station characteristics. In other words, the macro base station and the LPN have their respective cell identifiers, system information, and the like; when a user equipment UE (User Equipment) moves between the macro base station and the LPN, a series of resource configuration processes, such as a handover, may be caused. The second manner may be referred to as an S-PCI (same physical cell identifier) manner, where the LPN is considered as a transmission and reception point of the macro base station, and does not have all base station characteristics. Coverage areas of the LPN and the macro base station belong to a same cell, and the LPN and the macro base station have a same cell identifier and system information. In other words, an action that a UE moves between the macro base station and the LPN is an intra-cell movement, and therefore, a resource configuration process, such as a handover, is not caused.

For the D-PCI manner, a coverage area of a macro base station and a coverage area of an LPN belong to different cells, so that a spectrum resource may be fully reused to implement cell splitting. However, for the S-PCI manner, a coverage area of a macro base station and a coverage area of an LPN belong to a same cell and have a same cell-specific reference signal, and the like, so that it is difficult to implement cell splitting to reuse a spectrum resource, and efficiency of using the spectrum resource is relatively low.

SUMMARY

Embodiments of the present invention provide an access method and apparatus in a heterogeneous network, which can implement cell splitting of a heterogeneous network to effectively improve efficiency of using a spectrum resource.

According to a first aspect, an access method in a heterogeneous network is provided. A system message is broadcast to a user equipment. The system message includes configuration information of a cell access port and configuration information of at least one group of hot spot access port, so that the user equipment accesses the cell access port or a hot spot access port according to the system information. The heterogeneous network includes the cell access port and at least one hot spot access port, the at least one hot spot access port is grouped into at least one group, and each group of hot spot access port includes at least one hot spot access port.

In a first possible implementation manner, in the configuration information of the at least one group of hot spot access port, configuration information of each group of hot spot access port includes group configuration information, and the group configuration information includes at least one of the following types of information: configuration information of a random access sequence of a port; configuration information of a physical random access channel of a port; and list information of a port in a port group.

In a second possible implementation manner, with reference to the first aspect or the first possible implementation manner of the first aspect, in the configuration information of the at least one group of hot spot access port, the configuration information of each group of hot spot access port includes configuration information of each hot spot access port in the group; and the configuration information of each hot spot access port includes at least one of the following types of information:

configuration information of transmit power of a reference signal of a downlink port;

identifier information of an access port;

configuration information of a time-frequency resource of a reference signal of a downlink port;

configuration information of sequence initialization of a port;

configuration information of a downlink synchronization channel;

configuration information of a downlink synchronization sequence; and access threshold information of a port.

In a third possible implementation manner, with reference to the first aspect, after the broadcasting a system message to a user equipment, the method further includes: receiving a random access request from the user equipment, where a random access sequence configuration and a physical random access channel configuration that are used in the random access request are obtained by the user equipment by using the system information; determining, according to the random access sequence configuration and the physical random access channel configuration that are used in the random access request, whether the network device is a target uplink access port and a target downlink access port of the user equipment; and if it is determined that the network device is the target uplink access port of the user equipment but is not the target downlink access port of the user equipment, receiving an RRC link setup request of the user equipment, where an uplink signal that bears the RRC link setup request carries an uplink demodulation reference signal DMRS, the DMRS uses at least one type of configuration information, in the system message, of the target uplink access port as a sequence initialization parameter, and the at least one type of configuration information is in a one-to-one correspondence with the target uplink access port; if it is determined that the network device is the target downlink access port of the user equipment but is not the target uplink access port of the user equipment, sending a random access response to the user equipment; sending an RRC link configuration message to the user equipment, where the RRC link configuration information includes hot spot access port configuration information, and the hot spot access port configuration information indicates a hot spot access port that serves the user equipment; or if it is determined that the network device is the target downlink access port of the user equipment and the target uplink access port of the user equipment: sending a random access response to the user equipment; receiving an RRC link setup request of the user equipment, where an uplink signal that bears the RRC link setup request carries an uplink demodulation reference signal DMRS, the DMRS uses at least one type of configuration information, in the system message, of the target uplink access port as a sequence initialization parameter, and the at least one type of configuration information is in a one-to-one correspondence with the target uplink access port; and sending an RRC link configuration message to the user equipment, where the RRC link configuration information includes hot spot access port configuration information, and the hot spot access port configuration information indicates a hot spot access port that serves the user equipment.

In a fourth possible implementation manner, with reference to the third possible implementation manner of the first aspect, when the network device is the target uplink access port of the user equipment, the received RRC link setup request carries hot spot access port selection information, and the hot spot access port selection information indicates a preferred hot spot access port that is determined by the user equipment and can provide a service for the user equipment.

In a fifth possible implementation manner, with reference to the third or the fourth possible implementation manners of the first aspect, when the network device is the target downlink access port of the user equipment, the sent random access response includes an uplink access port and/or downlink access port reset indication.

According to a second aspect, an access method in a heterogeneous network is provided, where the method includes: receiving, by a user equipment, a system message, where the system message includes configuration information of a cell access port and configuration information of at least one group of hot spot access port; and accessing, by the user equipment, the cell access port or a hot spot access port according to the system information, where the heterogeneous network includes the cell access port and at least one hot spot access port, the at least one hot spot access port is grouped into at least one group, and each group of hot spot access port includes at least one hot spot access port.

In a first possible implementation manner, in the configuration information of the at least one group of hot spot access port, configuration information of each group of hot spot access port includes group configuration information, and the group configuration information includes at least one of the following types of information: configuration information of a random access sequence of a port; configuration information of a physical random access channel of a port; and list information of a port in a port group.

In a second possible implementation manner, with reference to the second aspect or the first possible implementation manner of the second aspect, in the configuration information of the at least one group of hot spot access port, the configuration information of each group of hot spot access port includes configuration information of each hot spot access port in the group; and the configuration information of each hot spot access port includes at least one of the following types of information:

configuration information of transmit power of a reference signal of a downlink port;
identifier information of an access port;
configuration information of a time-frequency resource of a reference signal of a downlink port;
configuration information of sequence initialization of a port;
configuration information of a downlink synchronization channel;
configuration information of a downlink synchronization sequence; and
access threshold information of a port.

In a third possible implementation manner, with reference to the second aspect, the accessing, by the user equipment, the cell access port or a hot spot access port according to the system information includes: acquiring, by the user equipment, a random access sequence configuration and a physical random access channel configuration of the cell access port from the system information; sending, by the user equipment, a random access request by using the random access sequence configuration and the physical random access channel configuration of the cell access port; receiving, by the user equipment, a random access response from the cell access port; sending, by the user equipment, a radio resource control RRC link setup request; and receiving, by the user equipment, RRC link configuration information from the cell access port, where the RRC link configuration information includes hot spot access port configuration information, and the hot spot access port configuration information indicates a hot spot access port that serves the user equipment.

In a fourth possible implementation manner, with reference to the third possible implementation manner of the second aspect, the configuration information of the at least one group of hot spot access port includes list information of a port in a port group; the method further includes: measuring, by the user equipment, a transmission path loss between the user equipment and a hot spot access port in the list of the port in the port group according to the system information; and the sending, by the user equipment, a random access request by using the random access sequence configuration and the physical random access channel configuration of the cell access port includes: determining transmit power of the random access request according to a minimum transmission path loss of the measured transmission path loss; and sending the random access request at the determined transmit power by using the random access sequence configuration and the physical random access channel configuration of the cell access port.

In a fifth possible implementation manner, with reference to the third possible implementation manner of the second aspect, the configuration information of the at least one group of hot spot access port includes list information of a port in a port group. The method further includes: measuring, by the user equipment, a transmission path loss between the user equipment and a hot spot access port in the list of the port in the port group according to the system information; and the sending, by the user equipment, a radio resource control RRC link setup request includes: determine transmit power of the RRC link setup request according to a minimum transmission path loss of the measured transmission path loss; and sending the RRC link setup request at the determined transmit power.

In a sixth possible implementation manner, with reference to the third or the fourth possible implementation manner of the second aspect, the RRC link setup request carries hot spot access port selection information, and the hot spot access port selection information indicates a preferred hot spot access port that is determined by the user equipment and can provide a service for the user equipment.

In a seventh possible implementation manner, with reference to the second aspect, the configuration information of the at least one group of hot spot access port includes list information of a port in a port group and access threshold information of each hot spot access port in the list of the port in the port group; and the accessing, by the user equipment, the cell access port or a hot spot access port according to the system information includes: measuring, by the user equipment, one group of information of the following two groups of information according to the system information: a first group: a transmission path loss between the user equipment and each hot spot access port in the list of the port in the port group; and a second group: a transmission path loss between the user equipment and each hot spot access port in the list of the port in the port group, and reception strength of a downlink reference signal between the user equipment and each hot spot access port in the port list; selecting, by the user equipment, an uplink access port and a downlink access port according to a result of the measurement; and accessing, by the user equipment, the selected uplink access port and downlink access port according to configuration information, which corresponds to the selected uplink access port and downlink access port, in the system information.

In an eighth possible implementation manner, with reference to the seventh possible implementation manner of the second aspect, the method further includes: determining, by the user equipment, a moving speed of the user equipment; and the selecting, by the user equipment, an uplink access port and a downlink access port according to a result of the measurement includes: selecting, by the user equipment, the uplink access port and the downlink access port according to the result of the measurement and the determined moving speed; if the moving speed of the user equipment is greater than a preset speed threshold, selecting, by the user equipment, the cell access port as the uplink access port and the downlink access port; and if the moving speed of the user equipment is not greater than the preset speed threshold, selecting, by the user equipment, the uplink access port and the downlink access port according to the result of the measurement.

In a ninth possible implementation manner, with reference to the seventh or the eighth possible implementation manner of the second aspect, the user equipment measures the first group of information; the access threshold information includes a transmission path loss threshold; and the selecting, by the user equipment, an uplink access port and a downlink access port according to a result of the measurement includes: determining, by the user equipment according to the result of the measurement, whether a hot spot access port with a transmission path loss being less than its transmission path loss threshold exists; and if a hot spot access port with a transmission path loss being less than its transmission path loss threshold exists, selecting, by the user equipment, a hot spot access port with a minimum transmission path loss from the hot spot access port with a transmission path loss being less than its transmission path loss threshold as the uplink access port and the downlink access port.

In a tenth possible implementation manner, with reference to the ninth possible implementation manner of the second aspect, after the determining, by the user equipment according to the result of the measurement, whether a hot spot access port with a transmission path loss being less than its transmission path loss threshold exists, the method includes: if a hot spot access port with a transmission path loss being less than its transmission path loss threshold does not exist, selecting, by the user equipment, the cell access port as the uplink access port and the downlink access port.

In an eleventh possible implementation manner, with reference to the seventh or the eighth possible implementation manner of the second aspect, the user equipment measures the second group of information; the access threshold information includes a transmission path loss threshold and a strength threshold; and the selecting, by the user equipment, an uplink access port and a downlink access port according to a result of the measurement includes: determining, by the user equipment according to the result of the measurement, whether a hot spot access port with a transmission path loss being less than its transmission path loss threshold exists, and whether a hot spot access port with reception strength of a downlink reference signal being greater than its strength threshold exists; and if a hot spot access port with a transmission path loss being less than its transmission path loss threshold and a hot spot access port with reception strength of a downlink reference signal being greater than its strength threshold both exist, selecting, by the user equipment, a hot spot access port with a minimum transmission path loss from the hot spot access port with a transmission path loss being less than its transmission path loss threshold as the uplink access port, and selecting a hot spot access port with maximum reception strength of a downlink reference signal from the hot spot access port with reception strength of a downlink reference signal being greater than its strength threshold as the downlink access port.

In a twelfth possible implementation manner, with reference to the eleventh possible implementation manner of the second aspect, after the determining, by the user equipment according to the result of the measurement, whether a hot spot access port with a transmission path loss being less than its transmission path loss threshold exists, and whether a hot spot access port with reception strength of a downlink reference signal being greater than its strength threshold exists, the method includes: if a hot spot access port with a transmission path loss being less than its transmission path loss threshold or a hot spot access port with reception strength of a downlink reference signal being greater than its strength threshold does not exist, selecting, by the user equipment, the cell access port as the uplink access port and the downlink access port.

In a thirteenth possible implementation manner, with reference to the seventh or the eighth possible implementation manner of the second aspect, the uplink access port and the downlink access port that are selected by the user equipment are a hot spot access port; the accessing, by the user equipment, the selected uplink access port and downlink access port according to configuration information, which corresponds to the selected uplink access port and downlink access port, in the system information includes: acquiring, by the user equipment, a random access sequence configuration and a physical random access channel configuration of the selected uplink access port from the system information; sending, by the user equipment, a random access request by using the random access sequence configuration and the physical random access channel configuration of the selected uplink access port, where transmit power at which the random access request is sent is determined according to a transmission path loss between the user equipment and the selected uplink access port; receiving, by the user equipment, a random access response from the selected uplink access port; sending, by the user equipment, a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receiving, by the user equipment, RRC link configuration information from the selected uplink access port, where the RRC link configuration information includes hot spot access port configuration information, and the hot spot access port configuration information indicates a hot spot access port that serves the user equipment.

In a fourteenth possible implementation manner, with reference to the seventh or the eighth possible implementation manner of the second aspect, the uplink access port and the downlink access port that are selected by the user equipment are a hot spot access port; the accessing, by the user equipment, the selected uplink access port and downlink access port according to configuration information, which corresponds to the selected uplink access port and downlink access port, in the system information includes: acquiring, by the user equipment, a physical random access channel configuration of the selected downlink access port and a random access sequence configuration of the selected uplink access port from the system information; sending, by the user equipment, a random access request by using the random access sequence configuration of the selected uplink access port and the physical random access channel configuration of the selected downlink access port, where transmit power at which the random access request is sent is determined according to a transmission path loss between the user equipment and the selected uplink access port; receiving, by the user equipment, a random access response from the selected downlink access port; sending, by the user equipment, a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receiving, by the user equipment, RRC link configuration information from the selected downlink access port, where the RRC link configuration information includes hot spot access port configuration information, and the hot spot access port configuration information indicates a hot spot access port that serves the user equipment.

In a fifteenth possible implementation manner, with reference to the seventh or the eighth possible implementation manner of the second aspect, the uplink access port and the downlink access port that are selected by the user equipment are a hot spot access port; the accessing, by the user equipment, the selected uplink access port and downlink access port according to configuration information, which corresponds to the selected uplink access port and downlink access port, in the system information includes: acquiring, by the user equipment, a physical random access channel configuration of the selected uplink access port and a random access sequence configuration of the selected downlink access port from the system information; sending, by the user equipment, a random access request by using the random access sequence configuration of the selected downlink access port and the physical random access channel configuration of the selected uplink access port, where transmit power at which the random access request is sent is determined according to a transmission path loss between the user equipment and the selected uplink access port; receiving, by the user equipment, a random access response from the selected downlink access port; sending, by the user equipment, a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receiving, by the user equipment, RRC link configuration information from the selected downlink access port, where the RRC link configuration information includes hot spot access port configuration information, and the hot spot access port configuration information indicates a hot spot access port that serves the user equipment.

In a sixteenth possible implementation manner, with reference to any one of the thirteenth to the fifteenth possible implementation manners of the second aspect, the random access response includes uplink and/or downlink access port reset indication information; and when the random access response includes the uplink access port reset indication information, after the receiving, by the user equipment, a random access response from the selected uplink access port, the method includes: re-initiating, by the user equipment, access to the uplink access port that is reset by using the uplink access port reset indication information; and when the random access response includes a downlink access port reset indication, after the sending, by the user equipment, a radio resource control RRC link setup request, the method includes: receiving, by the user equipment, RRC link configuration information from the downlink access port that is reset by using the downlink access port reset indication information.

In a seventeenth possible implementation manner, with reference to any one of the thirteenth to the fifteenth possible implementation manners of the second aspect, the RRC link setup request carries hot spot access port selection information, and the hot spot access port selection information indicates a preferred hot spot access port that is determined by the user equipment and can provide a service for the user equipment.

According to a third aspect, a network device that is applied to a heterogeneous network includes: a broadcasting unit, configured to broadcast a system message to a user equipment, where the system message includes configuration information of a cell access port and configuration information of at least one group of hot spot access port, so that the user equipment accesses the cell access port or a hot spot access port according to the system information, where: the heterogeneous network includes the cell access port and at least one hot spot access port, the at least one hot spot access port is grouped into at least one group, and each group of hot spot access port includes at least one hot spot access port.

In a first possible implementation manner, in the configuration information, which is broadcast by the broadcasting unit, of the at least one group of hot spot access port, configuration information of each group of hot spot access port includes group configuration information, and the group configuration information includes at least one of the following types of information: configuration information of a random access sequence of a port; configuration information of a physical random access channel of a port; and list information of a port in a port group.

In a second possible implementation manner, with reference to the third aspect or the first possible implementation manner of the third aspect, in the configuration information, which is broadcast by the broadcasting unit, of the at least one group of hot spot access port, the configuration information of each group of hot spot access port includes configuration information of each hot spot access port in the group; and the configuration information of each hot spot access port includes at least one of the following types of information: configuration information of transmit power of a reference signal of a downlink port; identifier information of an access port; configuration information of a time-frequency resource of a reference signal of a downlink port; configuration information of sequence initialization of a port; configuration information of a downlink synchronization channel; configuration information of a downlink synchronization sequence; and access threshold information of a port.

In a third possible implementation manner, with reference to the third aspect, the network device further includes: a receiving unit and a determining unit, where the receiving unit is configured to receive a random access request from the user equipment, where a random access sequence configuration and a physical random access channel configuration that are used in the random access request are obtained by the user equipment by using the system information; the determining unit is configured to determine, according to the random access sequence configuration and the physical random access channel configuration that are used in the random access request received by the receiving unit, whether the network device is a target uplink access port and a target downlink access port of the user equipment; and if the determining unit determines that the network device is the target uplink access port of the user equipment but is not the target downlink access port of the user equipment, the receiving unit is further configured to receive an RRC link setup request of the user equipment, where an uplink signal that bears the RRC link setup request carries an uplink demodulation reference signal DMRS, the DMRS uses at least one type of configuration information, in the system message, of the target uplink access port as a sequence initialization parameter, and the at least one type of configuration information is in a one-to-one correspondence with the target uplink access port; or if the determining unit determines that the network device is the target downlink access port of the user equipment but is not the target uplink access port of the user equipment, the network device further includes a sending unit, configured to: send a random access response to the user equipment; and send an RRC link configuration message to the user equipment, where the RRC link configuration information includes hot spot access port configuration information, and the hot spot access port configuration information indicates a hot spot access port that serves the user equipment; or if the determining unit determines that the network device is the target downlink access port of the user equipment and the target uplink access port of the user equipment, the network device further includes a sending unit, configured to send a random access response to the user equipment; the receiving unit is further configured to receive an RRC link setup request of the user equipment, where an uplink signal that bears the RRC link setup request carries an uplink demodulation reference signal DMRS, the DMRS uses at least one type of configuration information, in the system message, of the target uplink access port as a sequence initialization parameter, and the at least one type of configuration information is in a one-to-one correspondence with the target uplink access port; the sending unit is further configured to send an RRC link configuration message to the user equipment, where the RRC link configuration information includes hot spot access port configuration information, and the hot spot access port configuration information indicates a hot spot access port that serves the user equipment; and the receiving unit is further configured to receive an RRC link setup request of the user equipment, where an uplink signal that bears the RRC link setup request carries an uplink demodulation reference signal DMRS, the DMRS uses at least one type of configuration information, in the system message, of an uplink access port selected by the user equipment as a sequence initialization parameter, and the at least one type of configuration information is in a one-to-one correspondence with the target uplink access port.

In a fourth possible implementation manner, with reference to the third possible implementation manner of the third aspect, when the network device is the target uplink access port of the user equipment, the RRC link setup request received by the receiving unit carries hot spot access port selection information, and the hot spot access port selection information indicates a preferred hot spot access port that is determined by the user equipment and can provide a service for the user equipment.

In a fifth possible implementation manner, with reference to the third aspect or the third or the fourth possible implementation manner of the third aspect, the random access response includes an uplink access port and/or downlink access port reset indication.

According to a fourth aspect, a user equipment that is applied to a heterogeneous network is provided, including: a receiving unit, configured to receive a system message, where the system message includes configuration information of a cell access port and configuration information of at least one group of hot spot access port; and an access unit, configured to access the cell access port or a hot spot access port according to the system information, where the heterogeneous network includes the cell access port and at least one hot spot access port, the at least one hot spot access port is grouped into at least one group, and each group of hot spot access port includes at least one hot spot access port.

In a first possible implementation manner, in the configuration information of the at least one group of hot spot access port, configuration information of each group of hot spot access port includes group configuration information, and the group configuration information includes at least one of the following types of information: configuration information of a random access sequence of a port; configuration information of a physical random access channel of a port; and list information of a port in a port group.

In a second possible implementation manner, with reference to the fourth aspect or the first possible implementation manner of the fourth aspect, in the configuration information of the at least one group of hot spot access port, the configuration information of each group of hot spot access port includes configuration information of each hot spot access port in the group; and the configuration information of each hot spot access port includes at least one of the following types of information:

configuration information of transmit power of a reference signal of a downlink port;

identifier information of an access port;

configuration information of a time-frequency resource of a reference signal of a downlink port;

configuration information of sequence initialization of a port;

configuration information of a downlink synchronization channel;

configuration information of a downlink synchronization sequence; and access threshold information of a port.

In a third possible implementation manner, with reference to the fourth aspect, the access unit is specifically configured to: acquire a random access sequence configuration and a physical random access channel configuration of the cell access port from the system information received by the receiving unit; send a random access request by using the random access sequence configuration and the physical random access channel configuration of the cell access port; receive a random access response from the cell access port; send a radio resource control RRC link setup request; and receive RRC link configuration information from the cell access port, where the RRC link configuration information includes hot spot access port configuration information, and the hot spot access port configuration information indicates a hot spot access port that serves the user equipment.

In a fourth possible implementation manner, with reference to the third possible implementation manner of the fourth aspect, the configuration information of the at least one group of hot spot access port includes list information of a port in a port group; the access unit is further configured to measure a transmission path loss between the user equipment and a hot spot access port in the list of the port in the port group according to the system information received by the receiving unit; and the access unit is specifically configured to determine transmit power of the random access request according to a minimum transmission path loss of the measured transmission path loss, and send the random access request at the determined transmit power by using the random access sequence configuration and the physical random access channel configuration of the cell access port.

In a fifth possible implementation manner, with reference to the third possible implementation manner of the fourth aspect, the configuration information of the at least one group of hot spot access port includes list information of a port in a port group; the access unit is further configured to measure a transmission path loss between the user equipment and a hot spot access port in the list of the port in the port group according to the system information received by the receiving unit; and the access unit is specifically configured to: determine transmit power of the RRC link setup request according to a minimum transmission path loss of the measured transmission path loss; and send the RRC link setup request at the determined transmit power.

In a sixth possible implementation manner, with reference to any one of the third to the fifth possible implementation manners of the fourth aspect, the RRC link setup request sent by the access unit carries hot spot access port selection information, and the hot spot access port selection information indicates a preferred hot spot access port that is determined by the user equipment and can provide a service for the user equipment.

In a seventh possible implementation manner, with reference to the fourth aspect, the configuration information of the at least one group of hot spot access port includes list information of a port in a port group and access threshold information of each hot spot access port in the list of the port in the port group; and the access unit is specifically configured to: measure one group of information of the following two groups of information according to the system information received by the receiving unit: a first group: a transmission path loss between the user equipment and each hot spot access port in the list of the port in the port group; and a second group: a transmission path loss between the user equipment and each hot spot access port in the list of the port in the port group, and reception strength of a downlink reference signal between the user equipment and each hot spot access port in the port list; select an uplink access port and a downlink access port according to a result of the measurement; and access the selected uplink access port and downlink access port according to configuration information, which corresponds to the selected uplink access port and downlink access port, in the system information received by the receiving unit.

In an eighth possible implementation manner, with reference to the seventh possible implementation manner of the fourth aspect, the user equipment further includes a speed measuring unit, configured to determine a moving speed of the user equipment; and the access unit is specifically configured to: select the uplink access port and the downlink access port according to the result of the measurement and the moving speed of the user equipment that is determined by the speed measuring unit; if the moving speed of the user equipment is greater than a preset speed threshold, select the cell access port as the uplink access port and the downlink access port; and if the moving speed of the user equipment is not greater than the preset speed threshold, select the uplink access port and the downlink access port according to the result of the measurement.

In a ninth possible implementation manner, with reference to the seventh or the eighth possible implementation manner of the fourth aspect, the access threshold information includes a transmission path loss threshold; and the access unit is specifically configured to: measure the first group of information; determine, according to the result of the measurement, whether a hot spot access port with a transmission path loss being less than its transmission path loss threshold exists; and if a hot spot access port with a transmission path loss being less than its transmission path loss threshold exists, select a hot spot access port with a minimum transmission path loss from the hot spot access port with a transmission path loss being less than its transmission path loss threshold as the uplink access port and the downlink access port.

In a tenth possible implementation manner, with reference to the ninth possible implementation manner of the fourth aspect, the access unit is specifically configured to: if a hot spot access port with a transmission path loss being less than its transmission path loss threshold does not exist, select the cell access port as the uplink access port and the downlink access port.

In an eleventh possible implementation manner, with reference to the seventh or the eighth possible implementation manner of the fourth aspect, the access threshold information includes a transmission path loss threshold and a strength threshold; and the access unit is specifically configured to: measure the second group of information; determine, according to the result of the measurement, whether a hot spot access port with a transmission path loss being less than its transmission path loss threshold exists, and whether a hot spot access port with reception strength of a downlink reference signal being greater than its strength threshold exists; and if a hot spot access port with a transmission path loss being less than its transmission path loss threshold and a hot spot access port with reception strength of a downlink reference signal being greater than its strength threshold both exist, select a hot spot access port with a minimum transmission path loss from the hot spot access port with a transmission path loss being less than its transmission path loss threshold as the uplink access port, and select a hot spot access port with maximum reception strength of a downlink reference signal from the hot spot access port with reception strength of a downlink reference signal being greater than its strength threshold as the downlink access port.

In a twelfth possible implementation manner, with reference to the eleventh possible implementation manner of the fourth aspect, the access unit is specifically configured to: if a hot spot access port with a transmission path loss being less than its transmission path loss threshold or a hot spot access port with reception strength of a downlink reference signal being greater than its strength threshold does not exist, select the cell access port as the uplink access port and the downlink access port.

In a thirteenth possible implementation manner, with reference to the seventh or the eighth possible implementation manner of the fourth aspect, the uplink access port and the downlink access port that are selected by the access unit are a hot spot access port; and the access unit is specifically configured to: acquire a random access sequence configuration and a physical random access channel configuration of the selected uplink access port from the system information received by the receiving unit; send a random access request by using the random access sequence configuration and the physical random access channel configuration of the selected uplink access port, where transmit power at which the random access request is sent is determined according to a transmission path loss between the user equipment and the selected uplink access port; receive a random access response from the selected uplink access port; send a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receive RRC link configuration information from the selected uplink access port, where the RRC link configuration information includes hot spot access port configuration information, and the hot spot access port configuration information indicates a hot spot access port that serves the user equipment.

In a fourteenth possible implementation manner, with reference to the seventh or the eighth possible implementation manner of the fourth aspect, the uplink access port and the downlink access port that are selected by the access unit are a hot spot access port; and the access unit is specifically configured to: acquire a physical random access channel configuration of the selected downlink access port and a random access sequence configuration of the selected uplink access port from the system information received by the receiving unit; send a random access request by using the random access sequence configuration of the selected uplink access port and the physical random access channel configuration of the selected downlink access port, where transmit power at which the random access request is sent is determined according to a transmission path loss between the user equipment and the selected uplink access port; receive a random access response from the selected downlink access port; send a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receive RRC link configuration information from the selected downlink access port, where the RRC link configuration information includes hot spot access port configuration information, and the hot spot access port configuration information indicates a hot spot access port that serves the user equipment.

In a fifteenth possible implementation manner, with reference to the seventh or the eighth possible implementation manner of the fourth aspect, the uplink access port and the downlink access port that are selected by the access unit are a hot spot access port; the access unit is specifically configured to: measure a transmission path loss between the user equipment and the selected uplink access port according to configuration information, in the system information received by the receiving unit, of the selected uplink access port; acquire a physical random access channel configuration of the selected uplink access port and a random access sequence configuration of the selected downlink access port from the system information received by the receiving unit; send a random access request by using the random access sequence configuration of the selected downlink access port and the physical random access channel configuration of the selected uplink access port, where transmit power at which the random access request is sent is determined according to a transmission path loss between the user equipment and the selected uplink access port; receive a random access response from the selected downlink access port; send a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receive RRC link configuration information from the selected downlink access port, where the RRC link configuration information includes hot spot access port configuration information, and the hot spot access port configuration information indicates a hot spot access port that serves the user equipment.

In a sixteenth possible implementation manner, with reference to any one of the thirteenth to the fifteenth possible implementation manners of the fourth aspect, the random access response includes uplink and/or downlink access port reset indication information; and if the random access response includes the uplink access port reset indication information, the access unit is configured to: re-initiate access to the uplink access port that is reset by using the uplink access port reset indication information; and if the random access response includes a downlink access port reset indication, after sending the radio resource control RRC link setup request, the access unit receives RRC link configuration information from the downlink access port that is reset by using the downlink access port reset indication information.

In a seventeenth possible implementation manner, with reference to any one of the thirteenth to the fifteenth possible implementation manners of the fourth aspect, the RRC link setup request carries hot spot access port selection information, and the hot spot access port selection information indicates a preferred hot spot access port that is determined by the user equipment and can provide a service for the user equipment.

According to the access method, the network device, and the UE in a heterogeneous network that are provided in the embodiments of the present invention, the heterogeneous network includes a hot spot access port and a cell access port, where all hot spot access ports are grouped into at least one group, each group of hot spot access port includes one or more hot spot access ports, the network device may notify configuration information of one group or several groups of hot spot access ports obtained after the grouping to the UE by using a system message, or certainly, may notify configuration information of all hot spot access ports to the UE, and then the UE may, according to the system message, access the cell access port so that the cell access port provides coverage support, or access the hot spot access port so that the hot spot access port provides coverage support. In this way, in the heterogeneous network, not only the cell access port can provide coverage support for the UE, but also the hot spot access port can provide coverage support for the UE, so that cell splitting is implemented for the heterogeneous network, a physical spectrum resource of a cell may be reused by the hot spot access port and the cell access port, thereby effectively improving efficiency of using a spectrum resource.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1(a) is a schematic diagram of coverage support of a heterogeneous network according to an embodiment of the present invention;

FIG. 1(b) is another schematic diagram of coverage support of a heterogeneous network according to an embodiment of the present invention;

FIG. 2 is a flowchart of an access method in a heterogeneous network according to an embodiment of the present invention;

FIG. 5 is a flowchart of an access method in a heterogeneous network according to an embodiment of the present invention;

DETAILED DESCRIPTION OF ILLUSTRATIVE EMBODIMENTS

Figure 3:
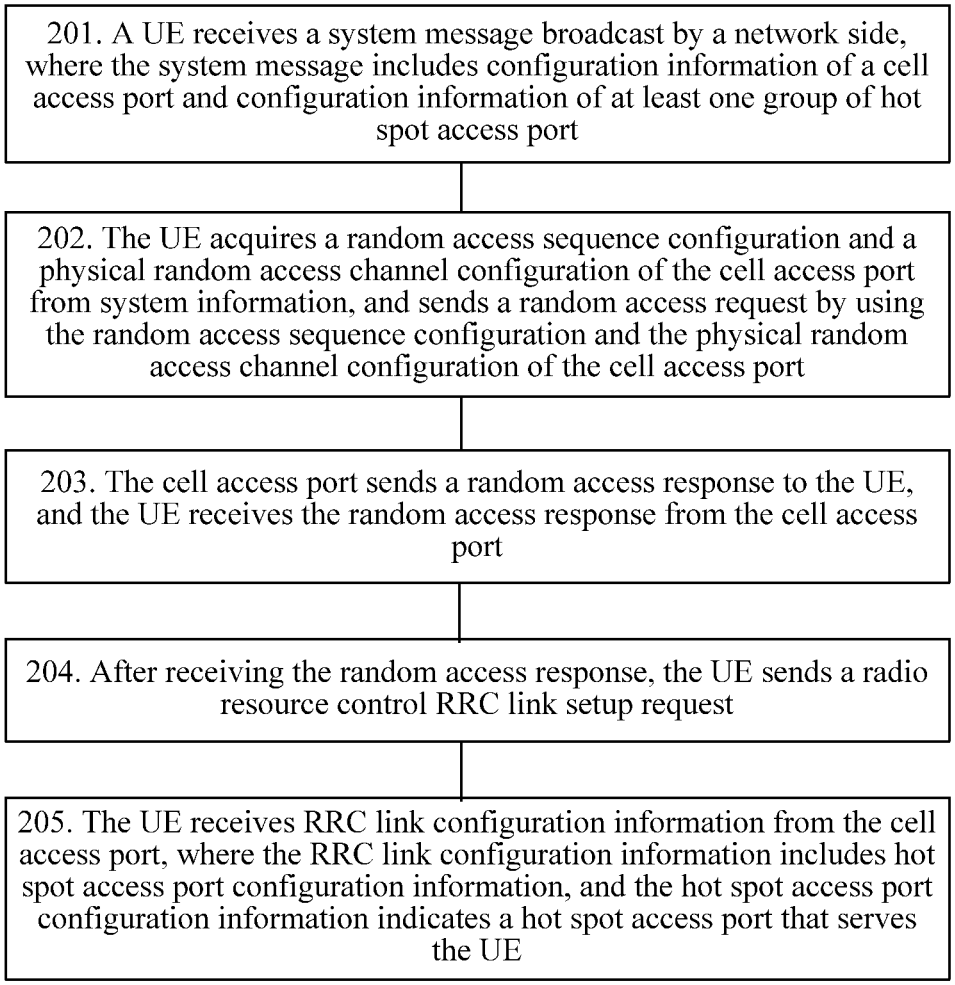
FIG. 3 is a flowchart of an access method in a heterogeneous network according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To enable a person skilled in the art to better understand the technical solutions in the embodiments of the present invention, application scenarios of the embodiments of the present invention are described first.

An access method and apparatus in a heterogeneous network provided in the embodiments of the present invention are applied to a heterogeneous network in an S-PCI manner in which a carrier of a macro base station and a carrier of an LPN are the same, and a heterogeneous network in which a carrier of a macro base station and a carrier of an LPN are different. In the heterogeneous networks, at least one LPN is deployed within coverage of the macro base station, and these LPNs are considered as transmission and reception points of the macro base station. Coverage areas of the LPN and the macro base station belong to a same cell, have a same cell identifier and system information, and have a same cell-specific reference signal CRS (Cell specific Reference Signal). In addition, the macro base station and the LPN may also work on different carriers.

In order to implement cell splitting of a heterogeneous network, in the technical solutions in the embodiments of the present invention, as shown in examples in FIG. 1(a) and FIG. 1(b), an inclined line part indicates coverage support. In this heterogeneous network, a macro base station is used as a cell access port; and an LPN may have two identities, one identity is used as a cell access port together with the macro base station, so as to provide coverage support for all UEs within a cell, and the other identity is used as a hot spot access port, so as to provide service coverage support for a UE within a partial area.

Therefore, in the technical solutions in the embodiments of the present invention, there may be two manners for coverage support. One manner is that the macro base station and the LPN are used as cell access ports to provide coverage support together for all UEs within a cell, and the LPN is further used as a hot spot access port to provide service coverage support for a UE within a partial area. The other manner is that the macro base station is separately used as a cell access port to provide coverage support for all UEs within a cell, and the LPN is used as a cell access port to provide service coverage support for a UE within a partial area.

In the embodiments of the present invention, a cell access port and a hot spot access port are defined as follows.

A cell access port is identified by a CRS, and can provide coverage support for all UEs within a cell. Specifically, for example, for a downlink access port, a downlink access port that provides coverage support for all UEs within a cell by using a time-frequency resource corresponding to a CRS that is used as a demodulation reference signal is a cell access port. It may be considered that downlink physical control channels that use CRSs as demodulation reference signals are all transmitted by the cell access port, for example, channels such as a physical downlink control channel PDCCH (Physical Downlink Control Channel), a physical hybrid repeat indicator channel PHICH (Physical HARQ Indicator Channel), and a physical control format indicator channel PCFICH (Physical Control Format Indicator Channel). For an uplink access port, if a channel resource used by an uplink physical control channel is determined by a system parameter of a cell, a target uplink access port of the uplink physical control channel is a cell access port, for example, channels such as a physical uplink control channel PUCCH (Physical Uplink Control Channel) and a channel sounding reference signal SRS (Sounding Reference Signal). Uplink reference signals of these channels are derived from a cell physical identifier PCI (Physical Cell Identity), and a receiving port of a PUCCH/SRS is a cell access port.

A hot spot access port is identified by a downlink port reference signal, and can provide coverage support for UEs within a partial area. Uplink and downlink physical control channels of different hot spot access ports may use a same time-frequency resource, but may be differentiated by using different channel parameters. Specifically, for example, for a downlink access port, it may be considered that downlink physical control channels that use DMRSs (Demodulation Reference Signal) as demodulation reference signals are all transmitted by a hot spot access port, for example, a physical channel such as an enhanced physical downlink control channel e-PDCCH; different hot spot access ports, when using a same time-frequency resource, are differentiated from each other by using different DMRS sequence parameters. For an uplink access port, if a channel resource that is used by an uplink physical control channel is determined by a non-cell level parameter, a target uplink access port of the uplink physical control channel is a hot spot access port; different hot spot access ports, when using a same time-frequency resource, are differentiated from each other by using different DMRS sequence parameters.

A physical resource that is used by a cell access port and a physical resource that is used by a hot spot access port may be on a same carrier or on different carriers. Optionally, in a case of a same carrier, a physical control channel between a UE and the cell access port is reused as a control channel between the UE and the hot spot access port in a fully orthogonal time division (TDM) and/or frequency division (FDM) manner, and a data channel between the UE and the cell access port is reused as a data channel between the UE and the hot spot access port in a time division (TDM) and/or frequency division (FDM) and/or space division (SDM) manner.

In addition, from the perspective of a UE, it is considered that different hot spot access ports are located at different geographical positions. A data channel and a control channel that are used by a UE near different hot spot access ports may reuse a same time-frequency resource.

In a heterogeneous network in an S-PCI manner, an LPN has no separate physical cell identifier PCI, but shares a same PCI with a macro base station. Therefore, the LPN and the macro base station are together used, or the macro base station is separately used as a cell access port to provide coverage support for a UE to access a network. The LPN forms a so-called hot spot access port, so that UEs (which are generally located at areas around LPNs) for which different LPNs provide coverage support may reuse a same time-frequency resource, so as to support more UEs to access a network.

It should be noted that a hot spot access port that provides partial coverage support for a UE may be a single LPN or a plurality of LPNs. For a UE that is far away from an LPN site or that moves at a high speed, referring to FIG. 1(a), the UE cannot reliably access a local hot spot coverage area that is formed by a single LPN or several LPNs. In this case, a macro base station, or a macro base station together with an LPN within a coverage area of the macro base station, is used as a cell access port to provide coverage support for such a UE.

Based on the description of the foregoing application scenarios, an embodiment of the present invention provides an access method in a heterogeneous network, where the heterogeneous network includes a cell access port and at least one hot spot access port, the at least one hot spot access port included in the heterogeneous network is grouped into at least one group, and each group of hot spot access port includes at least one hot spot access port. Optionally, in the heterogeneous network, hot spot access ports in hot spot access port groups are not repetitive, that is, hot spot access ports are different in hot spot access port groups. The method is executed by a macro base station or an LPN in the heterogeneous network, and includes the following step:

broadcasting a system message to a UE, where the system message includes configuration information of the cell access port and configuration information of at least one group of hot spot access port, so that the UE accesses the cell access port or a hot spot access port according to the configuration information of the cell access port and the configuration information of the at least one group of hot spot access port.

It should be noted that, in this embodiment of the present invention, the system message may be broadcast by the macro base station in the heterogeneous network, or may be broadcast by all or a part of LPNs in the heterogeneous network.

Corresponding to the method embodiment executed by the macro base station or the LPN in the heterogeneous network in the foregoing, as shown in FIG. 2, another access method in a heterogeneous network provided in an embodiment of the present invention is executed by a UE, and includes the following steps:

Step 101: A UE receives a system message, where the system message includes configuration information of a cell access port and configuration information of at least one group of hot spot access port.

Step 102: The UE accesses the cell access port or a hot spot access port according to system information.

According to the access method in a heterogeneous network provided in this embodiment of the present invention, all hot spot access ports inside the heterogeneous network are grouped into at least one group, each group of hot spot access port includes one or more hot spot access ports; a network side (a macro base station or an LPN) notifies configuration information of one or several groups of hot spot access ports obtained after the grouping to a UE by using a system message, or certainly, may notify configuration information of all hot spot access ports to a UE, and then the UE may, according to the system message, access a cell access port so that the cell access port provides coverage support, or access a hot spot access port so that the hot spot access port provides coverage support. In this way, in the heterogeneous network, not only the cell access port can provide coverage support for the UE, but also the hot spot access port can provide coverage support for the UE, so that cell splitting is implemented for the heterogeneous network, a physical spectrum resource of a cell may be reused by the hot spot access port and the cell access port, thereby effectively improving efficiency of using a spectrum resource.

Specifically, reference may be made to the prior art for the configuration information, in the system message, of the cell access port, which is not repeatedly described herein.

For example, in an embodiment of the present invention, in the configuration information, in the system message, of the at least one group of hot spot access port, configuration information of one group of hot spot access port may include group configuration information. Each group of hot spot access port corresponds to one set of group configuration information, where group configuration information of each group of hot spot access port is the same for any hot spot access port in the group.

Optionally, the group configuration information may include at least one of the following types of information:

PortPreambleConfig, which is configuration information of a random access sequence of a port;

PortPRACHConfig, which is configuration information of a physical random access channel of a port; and PortGroup, which is list information of a port in a port group.

In another embodiment of the present invention, in the configuration information, in the system message, of the at least one group of hot spot access port, configuration information of one group of hot spot access port may include configuration information of each hot spot access port in the group, where the configuration information of each hot spot access port is used by the port, and is the same as or different from configuration information of other hot spot access ports in this group or other groups.

It should be noted that, for each hot spot access port, at least one type of configuration information in configuration information of each hot spot access port is specific to the hot spot access port, where the meaning of "specific to" is that: configuration information specific to a hot spot access port is in a one-to-one correspondence with the hot spot access port, content of this type of configuration information of the hot spot access port is different from content of a same type of configuration information of other hot spot access ports, and access ports may be differentiated by using this specific type of configuration information, such as identifier information of an access port PortID, where each hot spot access port has a PortID, PortIDs of hot spot access ports are all different, and same or different access ports may be differentiated by using a PortID.

Optionally, the configuration information of each hot spot access port includes at least one of the following types of information:

PortRsTxPower, which is configuration information of transmit power of a reference signal of a downlink port;

PortID, which is identifier information of an access port;

PortRsConfig, which is configuration information of a time-frequency resource of a reference signal of a downlink port;

InitializationIndex, which is configuration information of sequence initialization of a port;

PortSychCHConfig, which is configuration information of a downlink synchronization channel;

PortSychSeqConfig, which is configuration information of a downlink synchronization sequence; and PortAccessThreshold, which is access threshold information of a port.

The following describes the foregoing types of configuration information in detail separately.

PortRsConfig

This configuration information is used to indicate a physical resource of a downlink port reference signal of a hot spot access port. In this embodiment of the present invention, the downlink port reference signal may be transmitted by using a single antenna port.

This configuration information may further include any one or a combination of: indication information of a time-frequency resource of a downlink reference signal, indication information of a code channel, indication information of transmission time, indication information of a transmission bandwidth, and carrier information.

The indication information of a time-frequency resource indicates a location of a time-frequency resource used by a downlink reference signal of the hot spot access port, specifically, a location of a resource element RE (Resource element), which is occupied by the downlink reference signal, inside a resource block RB (Resource Block). The indication information of a code channel indicates a code channel used by the downlink reference signal.

The indication information of transmission time may include a transmission period and a time offset within the transmission period. For example, if a transmission period is five subframes and a time offset is 1, the hot spot access port transmits a downlink reference signal in a subframe n, where n meets the following:

[n−1] mod 5=0, that is, a remainder of $n$ divided by 5 is 1.

The indication information of a transmission bandwidth indicates the number of RBs or locations of RBs occupied by a downlink reference signal.

Optionally, the carrier information indicates a location of a carrier on which a port reference signal works, where a user performs measurement on the indicated carrier to access a network.

InitializationIndex

This configuration information is used to generate a downlink port reference signal sequence, a downlink demodulation reference signal sequence, an uplink sounding reference signal sequence, or an uplink demodulation reference signal sequence.

If this configuration information is used to generate a downlink port reference signal sequence, for example, this configuration information is used to generate an initialization parameter Cinit=InitFunc(InitializationIndex) of the sequence, a generation function is used to generate a random sequence PNSeries=SequenceGenereator(Cinit), where InitFunc( ) is a function for generating an initialization parameter, and SequenceGenereator( ) is a function for generating a random sequence.

If this configuration information is used to generate a downlink demodulation reference signal sequence, optionally, this configuration information is used as one of parameters for generating a demodulation reference signal sequence.

If this configuration information is used to generate an uplink reference signal sequence, optionally, this configuration information is used as one of parameters for generating the reference signal sequence. An uplink reference signal may include an uplink sounding reference signal (SRS), an uplink demodulation reference signal (DMRS), an uplink control channel (PUCCH), or the like.

PortID

This information is ID information that identifies a hot spot access port. Within a coverage area of a cell, a PortID of each hot spot access port is unique, and a UE may obtain, by using information about this ID, downlink port reference signal information corresponding to this ID. Moreover, PortID is in a one-to-one mapping relationship with PortRsConifig.

Optionally, this information may be used to generate a downlink port reference signal sequence. For example, this PortID is used to generate an initialization parameter Cinit=InitFunc(PortID) of the downlink port reference signal sequence, and a generation function is used to generate a random sequence PNSeries=SequenceGenereator(Cinit), where InitFunc( ) is a function for generating an initialization parameter, and SequenceGenereator( ) is a function for generating a random sequence.

Optionally, this information may be used to generate a downlink demodulation reference signal sequence, and is used as one of parameters for generating the downlink demodulation reference signal sequence.

Optionally, this information is used to generate an uplink reference signal sequence, and is used as one of parameters for generating the uplink reference signal sequence. An uplink reference signal includes an uplink sounding reference signal (SRS), an uplink demodulation reference signal (DMRS), an uplink control channel (PUCCH), and the like.

PortRsTxPower

This configuration information is used to indicate transmit power of a downlink access port reference signal of a hot spot access port.

The transmit power may be used by a UE to measure a transmission path loss between a port corresponding to the downlink reference signal and the UE. For example, if receive power, which is currently measured by a UE, of a downlink port reference signal corresponding to PortRsConfig is PortRsRxPower, a corresponding transmission path loss PL=−log(PortRsRxPower/PortRxTxPower). A smaller PL indicates a smaller transmission path loss and a smaller distance between the UE and an access port; on the contrary, a larger PL indicates a larger distance between the UE and the access port. It should be noted that the foregoing manner for calculating a PL is merely exemplary, and a person skilled in the art may select a manner from a plurality of manners for calculating a PL.

PortSychCHConfig

This configuration information is used to indicate a location of a time-frequency resource that is used when a UE and a hot spot access port perform downlink synchronization, and may include resource location information, transmission time information, carrier information, and the like. The resource location information indicates a location of a resource block RB that is occupied by a downlink synchronization channel. Optionally, the transmission time information includes a transmission period and a time offset within the transmission period.

Optionally, the carrier information indicates a location of a carrier on which a downlink synchronization channel works, where a user performs downlink synchronization with the downlink synchronization channel on an indicated carrier.

PortSychSeqConfig

This configuration information is used to indicate sequence information that is used when a UE and a hot spot access port perform downlink synchronization. Optionally, a PortID of the hot spot access port may be used as one of input parameters for generating a synchronization sequence of the access port. Optionally, InitializationIndex may also be used as one of input parameters for generating the access downlink synchronization sequence.

PortAccessThreshold

This configuration information is used to indicate an access condition for a UE to access a hot spot access port. Optionally, this configuration information may include a transmission path loss threshold PLThreshold or a link strength threshold QualityThreshold.

For example, if a transmission path loss between a UE and a hot spot access port is PL, and if PL<PLThreshold, a status of a channel between the hot spot access port and the UE meets an access condition of the UE; otherwise, the access condition is not met.

Link strength may be measured by using RSRP or RSRQ. If a measured value of link strength between a UE and a hot spot access port is Quality, a larger value of Quality indicates better channel quality, and if Quality>QualityThreshold, the hot spot access port meets an access condition of the UE; otherwise, the condition is not met.

Reference may be made to 3GPP 36.214 for definitions of RSRP and RSRQ, which are not repeatedly described herein.

PortPreambleConfig

This configuration information is configuration information of an uplink random access sequence of a hot spot access port group, and provides a UE with information about a sequence that is used when the UE initiates uplink random access to the hot spot access port group.

Optionally, this configuration information may be RACH_ROOT_SEQUENCE, that is, a root sequence identifier, where a UE derives a group of sequences according to the root sequence identifier RACH_ROOT_SEQUENCE. Specifically, reference may also be made to specifications of an existing protocol.

Optionally, this configuration information may be a PortID of a hot spot access port, where a UE derives a group of access sequences according to the PortID or according to the PortID and a PCI.

The UE determines a random access sequence among the derived sequences according to a scheduling instruction or according to selection of the UE, so as to perform uplink access.

Reference may be made to 3GPP TS36.211 Rel.10 for RACH_ROOT_SEQUENCE, which is not repeatedly described herein.

PortPRACHConfig:

This configuration information is configuration information of a physical random access channel PRACH (Physical Random Access Channel) of a hot spot access port group.

Optionally, this configuration information provides a UE with information about a time-frequency resource that is used when the UE initiates uplink access to a hot spot access port group. For example, the information about a time-frequency resource may include prach-ConfigurationIndex and prach-FrequencyOffset. prach-ConfigurationIndex indicates a location of a time domain resource and prach-FrequencyOffset indicates a location of a frequency domain resource, and the UE transmits a random access sequence on the time-frequency resource indicated by the foregoing information, so as to perform uplink access.

Reference may be made to 3GPP TS36.211 Rel.10 for prach-ConfigurationIndex and prach-FrequencyOffset, which are not repeatedly described herein.

Optionally, this configuration information may be obtained by deriving from a PRACH configuration of a cell and a PortID of a hot spot access port.

Optionally, this configuration information may be obtained by deriving from a PortID of a hot spot access port.

The following describes an access method in a heterogeneous network according to the present invention in detail with reference to specific embodiments. The following specific embodiments focus on an access process of a UE. It should be noted that the following specific embodiments are merely used to describe the present invention, but are not intended to limit the present invention.

Embodiment 1

In this embodiment, a UE accesses a cell access port during initial access to a heterogeneous network. In other words, an uplink access port and a downlink access port corresponding to the UE are both the cell access port. As shown in FIG. 3, an access method in a heterogeneous network according to this embodiment includes the following steps:

Step 201: A UE receives a system message that is broadcast by a network side (broadcast by a macro base station and/or an LPN), where the system message includes configuration information of a cell access port and configuration information of at least one group of hot spot access port.

Step 202: The UE acquires a random access sequence configuration and a physical random access channel configuration of the cell access port from system information, and sends a random access request by using the random access sequence configuration and the physical random access channel configuration of the cell access port.

The macro base station and/or the LPN may detect a random access request of a user by using the random access sequence configuration and the physical random access channel configuration of the cell access port, and determine, according to a detection result, whether to send a random access response.

Step 203: The cell access port (which may be, for example, the macro base station, or the macro base station and the LPN) sends a random access response to the UE, and the UE receives the random access response from the cell access port.

Specifically, when the macro base station or the macro base station and the LPN determine, according to the detection result by using the random access sequence configuration and the physical random access channel configuration of the cell access port, to send the random access response, the cell access port sends the random access response to the UE, so that the UE can receive the random access response from the cell access port.

Step 204: After receiving the random access response, the UE sends a radio resource control RRC (Radio Resource Control) link setup request.

In this step, an uplink signal that bears the RRC link setup request carries an uplink demodulation reference signal DMRS, and the DMRS uses at least one type of configuration information, from the system message, of the cell access port as a sequence initialization parameter, where the configuration information is in a one-to-one correspondence with the cell access port, for example, physical identifier PCI information of the cell access port.

Step 205: The UE receives RRC link configuration information from the cell access port, where the RRC link configuration information includes hot spot access port configuration information, and the hot spot access port configuration information indicates a hot spot access port that serves the UE.

Optionally, the hot spot access port information further indicates a radio resource that is used by the hot spot access port that serves the UE.

The network side configures a hot spot access port for the UE, so as to provide uplink and downlink communication services for a user; after this step, the UE concurrently listens to control information from the cell access port and the hot spot access port that is configured for the UE in the hot spot access port configuration information.

Optionally, in another embodiment of the present invention, the UE may measure downlink reference signal received power corresponding to a hot spot access port, which can be detected by the UE, among hot spot access ports in a port list in the system message, so as to determine a preferred hot spot access port that can serve the UE, that is, one or more hot spot access ports with high downlink reference signal received power; then, hot spot access port selection information is carried in the RRC link setup request that is sent in step 204, where the hot spot access port selection information indicates the preferred hot spot access port that is determined by the UE and can serve the UE, so that the network side can configure, for the UE according to the preferred hot spot access port that is reported by the user, a hot spot access port that serves the UE.

Optionally, if the network side determines, according to a report of the UE and a result of uplink measurement, that a moving speed of the user is high, or that no hot spot access port meets an access condition of the UE, the network side does not configure a hot spot access port for the UE any longer; otherwise, the network side configures a hot spot access port for the UE.

It should be noted that, optionally, in this embodiment, after step 201, the method may further include the following step:

the UE measures a transmission path loss between the UE and each hot spot access port in a PortGroup according to the system information.

Specifically, the UE measures a transmission path loss of a hot spot access port, which can be detected by the UE, among hot spot access ports in the PortGroup.

In this case, optionally, in step 202, when the UE sends the random access request, transmit power at which the random access request is sent may be determined according to a minimum transmission path loss of the measured transmission path loss.

In this case, optionally, in step 204, when the UE sends the RRC link setup request, transmit power of the RRC link setup request may be determined according to a minimum transmission path loss of the measured transmission path loss.

Embodiment 2

Figure 4:
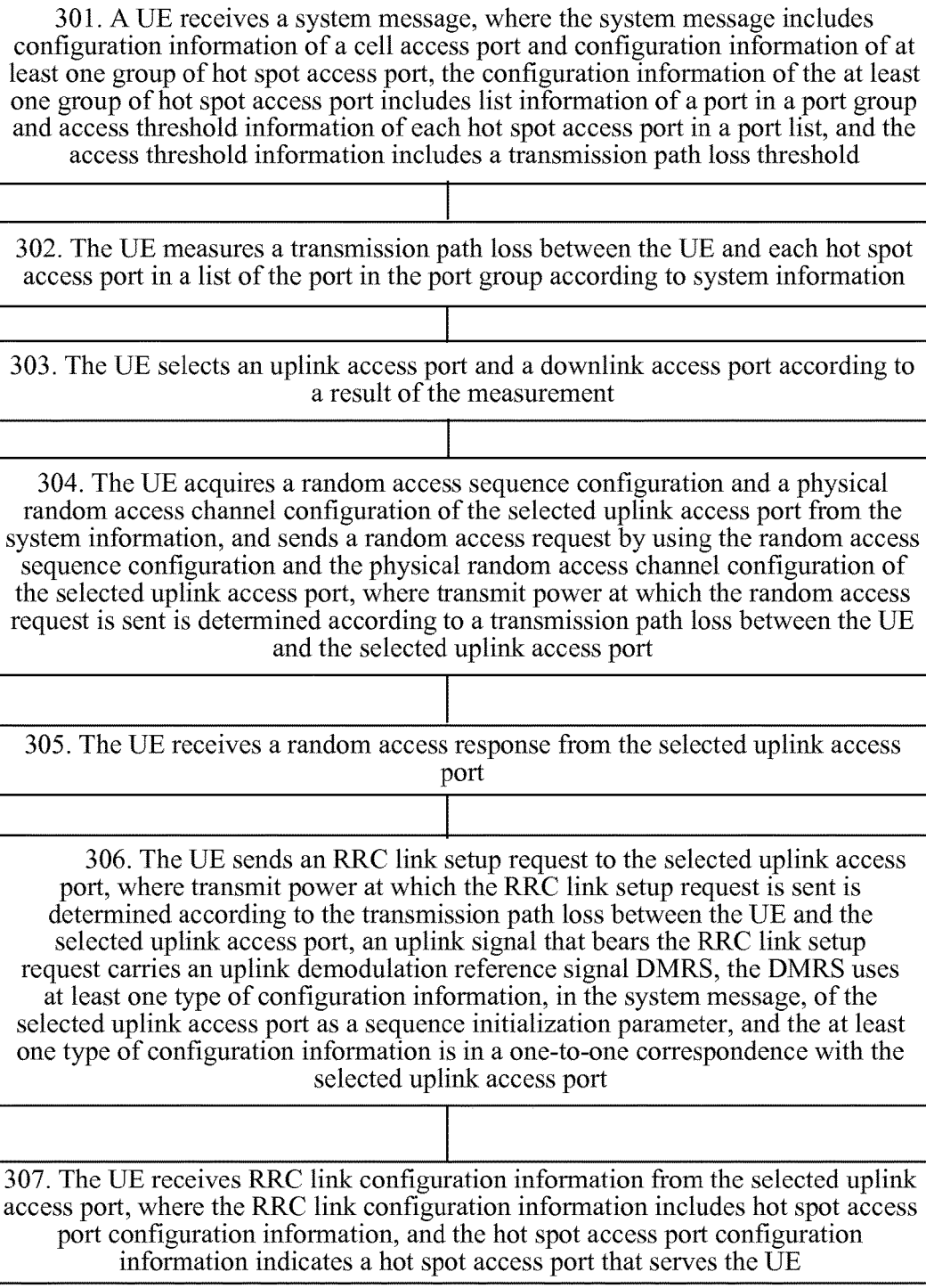
FIG. 4 is a flowchart of an access method in a heterogeneous network according to an embodiment of the present invention.

In this embodiment, a UE preferentially accesses a hot spot access port when executing random access. As shown in FIG. 4, an access method in a heterogeneous network according to this embodiment includes the following steps:

Step 301: A UE receives a system message that is broadcast by a network side (broadcast by a macro base station and/or an LPN), where the system message includes configuration information of a cell access port and configuration information of at least one group of hot spot access port, the configuration information of the at least one group of hot spot access port includes list information of a port in a port group and access threshold information PortAccessThreshold of each hot spot access port in a port list, and the PortAccessThreshold includes a transmission path loss threshold PLThreshold.

Step 302: The UE measures a transmission path loss between the UE and each hot spot access port in a list of the port in the port group according to system information.

Step 303: The UE selects an uplink access port and a downlink access port according to a result of the measurement.

In this step, specifically, the UE determines, according to the result of the measurement, whether a hot spot access port with a transmission path loss being less than its PLThreshold exists. If a hot spot access port with a transmission path loss being less than its PLThreshold exists, the UE selects a hot spot access port with a minimum transmission path loss from the hot spot access port with a transmission path loss being less than its PLThreshold as the uplink access port and the downlink access port, in other words, the uplink access port and the downlink access port are a same access port.

Optionally, if a hot spot access port with a transmission path loss being less than its PLThreshold does not exist, the UE selects the cell access port as the uplink access port and the downlink access port. If the UE selects the cell access port as the uplink access port and the downlink access port, access may be performed in the manner in Embodiment 1, which is not repeatedly described herein.

The following describes an access manner in which a user selects a hot spot access port as the uplink access port and the downlink access port, where the UE accesses the selected uplink access port and downlink access port according to configuration information, which corresponds to the selected uplink access port and downlink access port, in the system information. In this embodiment, because the uplink access port and the downlink access port that are selected by the user are a same hot spot access port, the following describes the uplink access port as an example. Next, the method according to this embodiment includes:

Step 304: The UE acquires a random access sequence configuration and a physical random access channel configuration of the selected uplink access port from the system information, and sends a random access request by using the random access sequence configuration and the physical random access channel configuration of the selected uplink access port, where transmit power at which the random access request is sent is determined according to a transmission path loss between the UE and the selected uplink access port.

Each hot spot access port detects the random access request of the UE by using its random access sequence configuration and physical random access channel configuration, and determines, according to a detection result, whether to send a random access response.

Because the random access request uses the random access sequence configuration and the physical random access channel configuration of the selected uplink access port, the uplink access port selected by the UE receives and detects the random access request of the UE, and determines, according to the random access sequence configuration and the physical random access channel configuration of the random access request, that the uplink access port is a target uplink and downlink access port of the UE, and the selected uplink access port responds to the access request.

Step 305: The UE receives a random access response from the selected uplink access port.

Step 306: The UE sends an RRC link setup request to the selected uplink access port.

Transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port, so that the selected uplink access port accurately receives the RRC link setup request.

Step 307: The UE receives RRC link configuration information from the selected uplink access port, where the RRC link configuration information includes hot spot access port configuration information, and the hot spot access port configuration information indicates a hot spot access port that serves the UE.

Optionally, the hot spot access port information further indicates a radio resource that is used by the hot spot access port that serves the UE.

The selected uplink access port configures a hot spot access port for the UE by using the hot spot access port configuration information, so as to provide uplink and downlink communication services for the user; after this step, the UE may concurrently listen to control information from the cell access port and the hot spot access port that is configured in the hot spot access port configuration information.

Optionally, in another embodiment of the present invention, the UE may measure received power of a downlink reference signal corresponding to a hot spot access port, which can be detected by the UE, among hot spot access ports in a port list in the system message, so as to determine a preferred hot spot access port that can serve the UE, that is, one or more hot spot access ports with higher received power of a downlink reference signal; then, hot spot access port selection information is carried in the RRC link setup request that is sent in step 306, where the hot spot access port selection information indicates the preferred hot spot access port that is determined by the UE and can serve the UE, so that the network side can configure, for the UE according to the preferred hot spot access port that is reported by the user, a hot spot access port that serves the UE.

In this embodiment, a transmission path loss is measured, and an uplink access port and a downlink access port are selected according to the transmission path loss. Optionally, in another embodiment of the present invention, the access method according to this embodiment may include that: the UE determines a moving speed of the UE. In this case, when selecting an uplink access port and a downlink access port, the UE first determines whether the moving speed of the UE is greater than a preset speed threshold; if the moving speed of the UE is greater than the preset speed threshold, the UE selects the cell access port as the uplink access port and the downlink access port; otherwise, the UE selects, in the manner in this embodiment, an uplink access port and a downlink access port according to a result of measurement of a transmission path loss. If the UE selects the cell access port as the uplink access port and the downlink access port, access may be performed in the manner in Embodiment 1, which is not repeatedly described herein.

Embodiment 3

Figure 6:
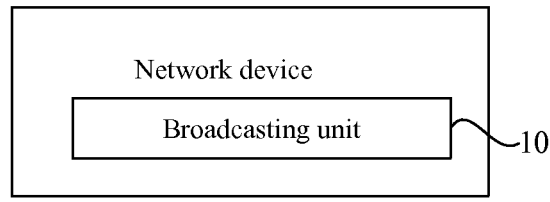
FIG. 6 is a structural block diagram of a network device according to an embodiment of the present invention.

In this embodiment, a UE preferentially accesses a hot spot access port when executing random access. As shown in FIG. 6, a cell access method in a heterogeneous network implemented in this embodiment includes the following steps:

Step 401: A UE receives a system message that is broadcast by a network side (broadcast by a macro base station and/or an LPN), where the system message includes configuration information of a cell access port and configuration information of at least one group of hot spot access port, the configuration information of the at least one group of hot spot access port includes list information of a port in a port group and access threshold information PortAccessThreshold of each hot spot access port in a port list, and the access threshold information includes a PLThreshold and a strength threshold QualityThreshold.

Step 402: The UE measures a transmission path loss between the UE and a hot spot access port in the port list and reception strength of a downlink reference signal between the UE and a hot spot access port in the port list according to system information.

Step 403: The UE selects an uplink access port and a downlink access port according to a result of the measurement.

In this step, specifically, the UE determines, according to the result of the measurement, whether a hot spot access port with a transmission path loss being less than its PLThreshold exists, and whether a hot spot access port with reception strength of a downlink reference signal being greater than its QualityThreshold exists. If a hot spot access port with a transmission path loss being less than its PLThreshold and a hot spot access port with reception strength of a downlink reference signal being greater than its QualityThreshold both exist, the UE selects a hot spot access port with a minimum transmission path loss from the hot spot access port with a transmission path loss being less than its PLThreshold as the uplink access port, and selects a hot spot access port with maximum reception strength of a downlink reference signal from the hot spot access port with reception strength of a downlink reference signal being greater than its QualityThreshold as the downlink access port.

Optionally, if a hot spot access port with a transmission path loss being less than its PLThreshold or a hot spot access port with reception strength of a downlink reference signal being greater than its QualityThreshold does not exist, the UE selects the cell access port as the uplink access port and the downlink access port.

In another embodiment of the present invention, the method according to this embodiment may include a step in which the UE determines a moving speed of the UE. In this case, when selecting an uplink access port and a downlink access port, the UE first determines whether the moving speed of the UE is greater than a preset speed threshold; if the moving speed of the UE is greater than the preset speed threshold, the UE selects the cell access port as the uplink access port and the downlink access port; otherwise, the UE selects, in the manner in this embodiment, an uplink access port and a downlink access port according to a result of measurement of a transmission path loss and reception strength of a downlink reference signal.

If the UE selects the cell access port as the uplink access port and the downlink access port, access may be performed in the manner in Embodiment 1, which is not repeatedly described herein. The following describes an access manner in which a user selects a hot spot access port as an uplink access port and a downlink access port, where the UE accesses the selected uplink access port and downlink access port according to configuration information, which corresponds to the selected uplink access port and downlink access port, in the system information.

In this embodiment, the uplink access port and the downlink access port selected by the user are a same hot sport access port or different hot spot access ports. After step 403, the method according to this embodiment includes:

Step 404: The UE acquires a physical random access channel configuration of the selected downlink access port and a random access sequence configuration of the selected uplink access port from the system information.

Step 405: The UE sends a random access request by using the random access sequence configuration of the selected uplink access port and the physical random access channel configuration of the selected downlink access port.

Transmit power at which the random access request is sent is determined according to a transmission path loss between the UE and the selected uplink access port.

In this embodiment, each hot spot access port stores its own random access sequence configuration and physical random access channel configuration, and physical random access channel configurations of other hot spot access ports; and each hot spot access port detects a random access request of the user first by using its own random access sequence configuration and physical random access channel configuration and then by using its own random access sequence configuration and the physical random access channel configurations of other access ports.

If the random access request of the UE is detected by a hot spot access port by using a random access sequence configuration and a physical random access channel configuration of the hot spot access port, it indicates that the hot spot access interface is the uplink access port and the downlink access port that are selected by the UE, and the hot spot access port responds to the access request. If the random access request of the UE is detected by a hot spot access port by using a random access sequence configuration of the hot spot access port and a physical random access channel configuration of another hot spot access port, it indicates that the hot spot access port is the uplink access port selected by the UE, and the another hot spot access port is the downlink access port selected by the UE; the hot spot access port instructs, the downlink access port selected by the UE, to respond to the random access request sent by the UE.

Step 406: The UE receives a random access response from the selected downlink access port.

Step 407: The UE sends an RRC link setup request to the selected uplink access port.

Transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port, so that the selected uplink access port accurately receives the RRC link setup request.

Step 408: The UE receives RRC link configuration information from the selected downlink access port, where the RRC link configuration information includes hot spot access port configuration information, and the hot spot access port configuration information indicates a hot spot access port that serves the UE.

Optionally, the hot spot access port information further indicates a radio resource that is used by the hot spot access port that serves the UE.

It may be understood that, because the transmit power at which the UE sends the random access request and the transmit power at which the UE sends the RRC link setup request are determined according to the transmission path loss between the UE and the selected uplink access port, the method according to this embodiment further includes a step of measuring the transmission path loss between the UE and the selected uplink access port.

Optionally, in another embodiment of the present invention, the UE may measure reception strength of a downlink reference signal corresponding to a hot spot access port, which can be detected by the UE, among hot spot access ports in a port list in the system message, so as to determine a preferred hot spot access port that can serve the UE, that is, one or more hot spot access ports with higher reception strength of a downlink reference signal; then, hot spot access port selection information is carried in the RRC link setup request that is sent in step 406, where the hot spot access port selection information indicates the preferred hot spot access port that is determined by the UE and can serve the UE, so that the network side can configure, for the UE according to the preferred hot spot access port that is reported by the user, a hot spot access port that serves the UE.

Optionally, in another embodiment of the present invention, a difference from this embodiment lies in that, in step 404, the UE acquires a physical random access channel configuration of the selected uplink access port and a random access sequence configuration of the selected downlink access port from the system information; and in step 405, the UE sends a random access request by using the random access sequence configuration of the selected downlink access port and the physical random access channel configuration of the selected uplink access port. In this way, on the network side, each hot spot access port needs to determine, by using a physical random access channel configuration, the uplink access port selected by the UE, that is, a target uplink access port, and determine a target downlink access port of the UE by using a random access sequence configuration; other steps are similar to those in this embodiment, which are not repeatedly described herein.

Further, in another embodiment of the present invention, when the target downlink access port selected by the UE sends a random access response to the UE, the random access response may be used to change one port or two ports of the target uplink access port and the target downlink access port that are selected by the UE. Specifically, the target downlink access port selected by the UE may re-determine an uplink access port and/or a downlink access port of the UE, and include an uplink access port and/or downlink access port reset indication into the random access response, so as to notify the changed uplink access port and/or downlink access port to the UE. If the random access response includes the uplink access port reset indication information, after the UE receives the random access response from the selected uplink access port, the UE re-initiates access to the uplink access port that is reset by using the uplink access port reset indication information; reference may be made to the foregoing embodiment for an access process, which is not repeatedly described herein. If the random access response includes a downlink access port reset indication, after the UE sends the radio resource control RRC link setup request, RRC link configuration information received by the UE is from the downlink access port that is reset by using the downlink access port reset indication information.

Uplink and downlink resource reuse of a hot spot access port and a cell access port after an RRC connection is set up is described in the following.

In a case in which a hot spot access port serving a UE is configured for the UE, on a data channel, a control channel, and the like that are involved in communication between the UE and a hot spot access port, reuse of a same time-frequency resource between different hot spot access ports needs to be implemented by using configuration information of the hot spot access port in a system message.

For example, in a downlink, configuration information specific to a corresponding hot spot access port, for example, identifier information PortID of a hot spot port, is required for generating sequences such as a scrambling sequence of a downlink data channel, a scrambling sequence of a downlink control channel, a demodulation reference signal sequence of a downlink control channel, and a demodulation reference signal sequence of a downlink data channel from a hot spot access port, where configuration information specific to each hot spot access port is unique within a coverage area of a cell, and is in a one-to-one correspondence with the hot spot access port.

For example, in an uplink, configuration information specific to a corresponding uplink hot spot access port, such as a PortID, is required for generating sequences such as a scrambling sequence of an uplink data channel, a CAZAC sequence used by an uplink control channel, a demodulation reference signal (DMRS) sequence of an uplink control channel, a demodulation reference signal (DMRS) sequence of an uplink data channel, and an uplink sounding reference signal (SRS) sequence for the hot spot access port. Reference may be made to 3GPP 36.211 for the CAZAC sequence.

In a case in which a hot spot access port serving a UE is configured for the UE, for the UE, it may be preset or be configured by using signaling whether the UE concurrently listens to two types of downlink physical control channels of a cell access port and the configured hot spot access port, and reception priorities of the two types of channels may also be preset or be configured by using signaling.

For example, in an embodiment of the present invention, It may be configured that: a UE listens to a downlink physical control channel from a cell access port in either an idle IDLE state or an RRC connected state, and the UE may further concurrently listen to and receive a downlink physical control channel from a hot spot access port in an RRC connected state.

For reception of uplink or downlink service channel PDSCH/PUSCH of the UE, scheduling information carried by the uplink or downlink service channel PDSCH/PUSCH is preferentially transmitted on a downlink physical control channel of the hot spot access port.

For reception and sending of RRC information related to a resource configuration of a hot spot access port, such as configuration information of the hot spot access port, a reset request, and a modification, scheduling information corresponding thereto is preferentially transmitted on a downlink physical control channel of the cell access port.

For system control channels such as a PBCH (broadcast channel)/a PCH (paging channel), a downlink physical control channel corresponding thereto may be preferentially transmitted on the cell access port.

A PDCCH to which a UE needs to concurrently listen has two formats. That is, in a case in which no hot spot access port is configured, the UE needs to listen to PDCCHs in two formats only from the cell access port; and in a case in which a hot spot access port is configured, the UE needs to separately listen to a PDCCH in one format from the cell access port and a PDCCH in one format from the hot spot access port.

For example, for each mode of nine downlink modes, which are defined in 3GPP 36.213 a.3.0, of a PDSCH, a user needs to detect PDCCHs in two formats; in the PDCCHs in two formats, one is a DCI (Downlink Control Information, downlink control information) format 1A, and the other is a DCI format corresponding to a current PDSCH transmission mode, where the number of blind detections required for each format is 22. In a case in which the UE listens to a downlink control channel from a cell access port, the UE needs to detect only a PDCCH in the former format, that is, the DCI format 1A; and in a case in which the UE listens to a downlink control channel from a hot spot access port, the UE needs to detect only a PDCCH in the latter format.

For example, for each mode of two uplink modes of a PDSCH that are defined in 3GPP 36.213 a.3.0, a user needs to detect a DCI format 0; and for a mode 2, the user needs to additionally detect a DCI format 4 corresponding to the uplink transmission mode. The number of blind detections required for each format is 22. However, in a case in which the UE listens to a downlink control channel from a cell access port, the UE needs to detect only a PDCCH in the former format, that is, the DCI format 0.

A format of a downlink control channel, to which the UE listens at a hot spot access port may be configured by a system, where the format may include, but is not limited to, downlink physical control channel parameters, such as the number of information bits included by a downlink physical control channel of the hot spot access port, a used modulation scheme, an available resource aggregation level, and a downlink transmission mode.

For example:

The system may configure the number of information bits included by a downlink physical control channel of a hot spot access port, so that different numbers of bits correspond to different formats of the downlink physical control channel, and content borne by the channel is also different.

The system may configure a modulation scheme that is used by the downlink physical control channel of the hot spot access port, so that in a case in which quality of a downlink channel between a UE and a hot spot port is good, the system may flexibly configure a modulation scheme that is used by the downlink control channel of the hot spot access port, such as QPSK, 16QAM, and 64QAM.

The system may configure a resource aggregation level that is used by the downlink control channel of the hot spot access port.

For example, there may be resource aggregation levels (Aggregation Level) 1, 2, 4, and 8 in a UE-specific search space in Table 9.1.1-1 in 3GPP 36.213 a.3.0. The number of blind detections corresponding thereto is 22 (6+6+2+2+4+2). If the system configures that resource aggregation levels of a downlink physical control channel of a hot spot access port that is detected by a UE is 2 and 4, the number of blind detections corresponding thereto is 8 (6+2).

The system may configure a downlink transmission mode that is used by the downlink physical control channel of the hot spot access port. Available transmission modes may include, but are not limited to, the following several transmission modes that are defined in 3GPP 36.213 a.3.0 7.1:

Single-antenna port mode Single-antenna port
Transmit diversity mode Transmit diversity
Large delay cyclic delay diversity mode Large delay CDD
Closed-loop spatial multiplexing mode Close-loop spatial multiplexing
Single-antenna port mode (port 5) Single-antenna port, port 5
Closed-loop spatial multiplexing mode using a single transmission layer Closed-loop spatial multiplexing using a single transmission layer
Dual layer transmission mode, port 7 and 8 Dual layer transmission, port 7 and 8
Up to 8 layer transmission mode, (ports 7-14) Up to 8 layer transmission, ports 7-14

For example, if a configured transmission mode is Transmit diversity, the UE uses a receiver form corresponding to Transmit diversity to detect and listen to the downlink physical control channel from the hot spot access port.

Corresponding to the foregoing method embodiments, an embodiment of the present invention further provides a network device that is applied to a heterogeneous network, where the heterogeneous network includes a cell access port and at least one hot spot access port, the at least one hot spot access port included in the heterogeneous network is grouped into at least one group, and each group of hot spot access port includes at least one hot spot access port. The network device may be a macro base station or an LPN. When the network device is a macro base station, the network device is used as a cell access port; and when the network device is an LPN, the network device has two identities, that is, a cell access port and a hot spot access port. As shown in FIG. 6, the network device provided in this embodiment of the present invention includes:

a broadcasting unit 10, configured to broadcast a system message to a UE, where the system message includes configuration information of a cell access port and configuration information of at least one group of hot spot access port, so that the UE accesses the cell access port or a hot spot access port according to system information.

According to the network device that is applied to a heterogeneous network provided in this embodiment of the present invention, the heterogeneous network includes a hot spot access port and a cell access port, where all hot spot access ports are grouped into at least one group, each group of hot spot access port includes one or more hot spot access ports, the network device may notify configuration information of one group or several groups of hot spot access ports obtained after the grouping to a UE by using a system message, or certainly, may notify configuration information of all hot spot access ports to a UE, and then the UE may, according to the system message, access the cell access port so that the cell access port provides coverage support, or access the hot spot access port so that the hot spot access port provides coverage support. In this way, in the heterogeneous network, not only the cell access port can provide coverage support for the UE, but also the hot spot access ports can provide coverage support for the UE, so that cell splitting is implemented for the heterogeneous network, a physical spectrum resource of a cell may be reused by the hot spot access port and the cell access port, thereby effectively improving efficiency of using a spectrum resource.

Optionally, in an embodiment of the present invention, in the configuration information, which is broadcast by the broadcasting unit 10, of the at least one group of hot spot access port, configuration information of each group of hot spot access port includes group configuration information, and the group configuration information includes at least one of the following types of information:

PortPreambleConfig, which is configuration information of a random access sequence of a port;

PortPRACHConfig, which is configuration information of a physical random access channel of a port; and PortGroup, which is list information of a port in a port group.

Optionally, in an embodiment of the present invention, in the configuration information, which is broadcast by the broadcasting unit 10, of the at least one group of hot spot access port, configuration information of each group of hot spot access port includes configuration information of each hot spot access port in the group, and the configuration information of each hot spot access port includes at least one of the following types of information:

PortRsTxPower, which is configuration information of transmit power of a reference signal of a downlink port;

PortID, which is identifier information of an access port;

PortRsConfig, which is configuration information of a time-frequency resource of a reference signal of a downlink port;

InitializationIndex, which is configuration information of sequence initialization of a port;

PortSychCHConfig, which is configuration information of a downlink synchronization channel;

PortSychSeqConfig, which is configuration information of a downlink synchronization sequence; and PortAccessThreshold, which is access threshold information of a port.

Figure 7:
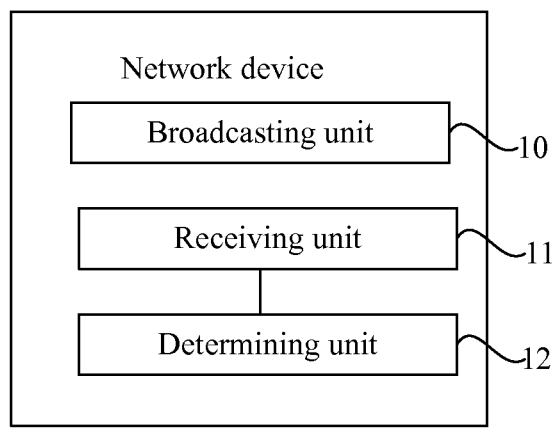
FIG. 7 is a structural block diagram of a network device according to an embodiment of the present invention.

Optionally, in an embodiment of the present invention, as shown in FIG. 7, the network device provided in this embodiment of the present invention further includes a receiving unit 11 and a determining unit 12, where:

the receiving unit 11 is configured to receive a random access request from the user equipment, where a random access sequence configuration and a physical random access channel configuration that are used in the random access request are obtained by the user equipment by using the system information;

the determining unit 12 is configured to determine, according to the random access sequence configuration and the physical random access channel configuration that are used in the random access request received by the receiving unit 11, whether the network device is a target uplink access port and a target downlink access port of the user equipment; and the receiving unit 11 is further configured to, if the determining unit 12 determines that the network device is the target uplink access port of the user equipment but is not the target downlink access port of the user equipment, receive an RRC link setup request of the user equipment, where an uplink signal that bears the RRC link setup request carries an uplink demodulation reference signal DMRS, the DMRS uses at least one type of configuration information, in the system message, of the target uplink access port as a sequence initialization parameter, and the at least one type of configuration information is in a one-to-one correspondence with the target uplink access port.

Figure 8:
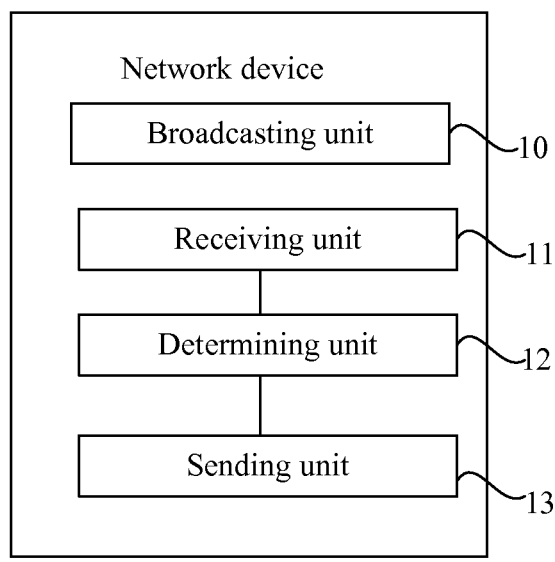
FIG. 8 is a structural block diagram of a network device according to an embodiment of the present invention.

Optionally, in an embodiment of the present invention, as shown in FIG. 8, the network device provided in this embodiment of the present invention further includes a receiving unit 11, a determining unit 12, and a sending unit 13, where:

the receiving unit 11 is configured to receive a random access request from the user equipment, where a random access sequence configuration and a physical random access channel configuration that are used in the random access request are obtained by the user equipment by using the system information;

the determining unit 12 is configured to determine, according to the random access sequence configuration and the physical random access channel configuration that are used in the random access request received by the receiving unit 11, whether the network device is a target uplink access port and a target downlink access port of the user equipment; and the sending unit 13 is configured to, if the determining unit 12 determines that the network device is the target downlink access port of the user equipment but is not the target uplink access port of the user equipment, send a random access response to the user equipment; and send an RRC link configuration message to the user equipment, where the RRC link configuration information includes hot spot access port configuration information, and the hot spot access port configuration information indicates a hot spot access port that serves the user equipment.

Optionally, in another embodiment of the present invention, if the determining unit 12 determines that the network device is the target downlink access port of the user equipment and the target uplink access port of the user equipment, the receiving unit 11 is further configured to receive an RRC link setup request of the user equipment, where an uplink signal that bears the RRC link setup request carries an uplink demodulation reference signal DMRS, the DMRS uses at least one type of configuration information, in the system message, of the target uplink access port as a sequence initialization parameter, and the at least one type of configuration information is in a one-to-one correspondence with the target uplink access port;

the sending unit 13 is further configured to send an RRC link configuration message to the user equipment, where the RRC link configuration information includes hot spot access port configuration information, and the hot spot access port configuration information indicates a hot spot access port that serves the user equipment; and the receiving unit 11 is further configured to, when it is determined that the network device is the target uplink access port of the user equipment, receive an RRC link setup request of the user equipment, where an uplink signal that bears the RRC link setup request carries an uplink demodulation reference signal DMRS, the DMRS uses at least one type of configuration information, in the system message, of an uplink access port selected by the user equipment as a sequence initialization parameter, and the at least one type of configuration information is in a one-to-one correspondence with the target uplink access port.

Optionally, in an embodiment of the present invention, the RRC link setup request received by the receiving unit 11 carries hot spot access port selection information, and the hot spot access port selection information indicates a preferred hot spot access port that is determined by the UE and can provide a service for the UE.

Optionally, in an embodiment of the present invention, the random access response sent by the sending unit 13 includes an uplink access port and/or downlink access port reset indication.

Figure 9:
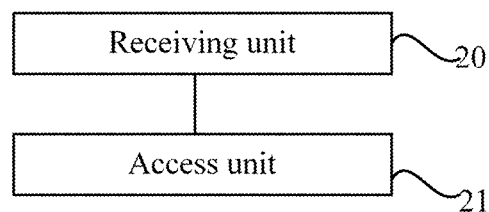
FIG. 9 is a structural block diagram of a UE according to an embodiment of the present invention.

Corresponding to the foregoing method embodiments, an embodiment of the present invention further provides a UE that is applied to a heterogeneous network, where the heterogeneous network includes a cell access port and at least one hot spot access port, the at least one hot spot access port included in the heterogeneous network is grouped into at least one group, and each group of hot spot access port includes at least one hot spot access port. As shown in FIG. 9, the UE provided in this embodiment of the present invention includes:

a receiving unit 20, configured to receive a system message, where the system message includes configuration information of a cell access port and configuration information of at least one group of hot spot access port; and an access unit 21, configured to access the cell access port or a hot spot access port according to system information.

According to the UE that is applied to a heterogeneous network provided in this embodiment of the present invention, the heterogeneous network includes a hot spot access port and a cell access port, where all hot spot access ports are grouped into at least one group, each group of hot spot access port includes one or more hot spot access ports, configuration information of grouped one group or several groups of hot spot access ports obtained after the grouping is notified to the UE by using a system message, or certainly, configuration information of all hot spot access ports may be notified to the UE, and then the UE may, according to the system message, access the cell access port so that the cell access port provides coverage support, or access the hot spot access port so that the hot spot access port provides coverage support. In this way, in the heterogeneous network, not only the cell access port can provide coverage support for the UE, but also the hot spot access port can provide coverage support for the UE, so that cell splitting is implemented for the heterogeneous network.

Optionally, in an embodiment of the present invention, in the configuration information of the at least one group of hot spot access port, configuration information of each group of hot spot access port includes group configuration information, and the group configuration information includes at least one of the following types of information:

PortPreambleConfig, which is configuration information of a random access sequence of a port;

PortPRACHConfig, which is configuration information of a physical random access channel of a port; and PortGroup, which is list information of a port in a port group.

Optionally, in an embodiment of the present invention, in the configuration information of the at least one group of hot spot access port, configuration information of each group of hot spot access port includes configuration information of each hot spot access port in the group, and the configuration information of each hot spot access port includes at least one of the following types of information:

PortRsTxPower, which is configuration information of transmit power of a reference signal of a downlink port;

PortID, which is identifier information of an access port;

PortRsConfig, which is configuration information of a time-frequency resource of a reference signal of a downlink port;

InitializationIndex, which is configuration information of sequence initialization of a port;

PortSychCHConfig, which is configuration information of a downlink synchronization channel;

PortSychSeqConfig, which is configuration information of a downlink synchronization sequence; and PortAccessThreshold, which is access threshold information of a port.

Optionally, in an embodiment of the present invention, the access unit 21 is specifically configured to:

acquire a random access sequence configuration and a physical random access channel configuration of the cell access port from the system information received by the receiving unit 20;

send a random access request by using the random access sequence configuration and the physical random access channel configuration of the cell access port;

receive a random access response from the cell access port;

send a radio resource control RRC link setup request; and receive RRC link configuration information from the cell access port, where the RRC link configuration information includes hot spot access port configuration information, and the hot spot access port configuration information indicates a hot spot access port that serves the user equipment.

Optionally, the configuration information, in the system message received by the receiving unit 20, of the at least one group of hot spot access port includes list information of a port in a port group.

The access unit 21 is further configured to measure a transmission path loss between the user equipment and a hot spot access port in the list of the port in the port group according to the system information received by the receiving unit 20.

In this case, optionally, the access unit 21 is specifically configured to determine transmit power of the random access request according to a minimum transmission path loss of the measured transmission path loss, and send the random access request at the determined transmit power by using the random access sequence configuration and the physical random access channel configuration of the cell access port.

In this case, optionally, the access unit 21 is specifically configured to determine transmit power of the RRC link setup request according to a minimum transmission path loss of the measured transmission path loss.

Optionally, in an embodiment of the present invention, the RRC link setup request sent by the access unit 21 carries hot spot access port selection information, and the hot spot access port selection information indicates a preferred hot spot access port that is determined by the user equipment and can provide a service for the user equipment.

Optionally, in an embodiment of the present invention, the configuration information, which is received by the receiving unit 20, of the at least one group of hot spot access port includes list information of a port in a port group and access threshold information of each hot spot access port in a list of the port in the port group.

The access unit 21 is specifically configured to:

measure one group of information of the following two groups of information according to the system information received by the receiving unit 20:

a first group: a transmission path loss between the UE and each hot spot access port in the list of the port in the port group; and a second group: a transmission path loss between the UE and each hot spot access port in the list of the port in the port group, and reception strength of a downlink reference signal between the UE and each hot spot access port in the list of the port in the port group;

select an uplink access port and a downlink access port according to a result of the measurement; and access the selected uplink access port and downlink access port according to configuration information, which corresponds to the selected uplink access port and downlink access port, in the system information received by the receiving unit 20.

Figure 10:
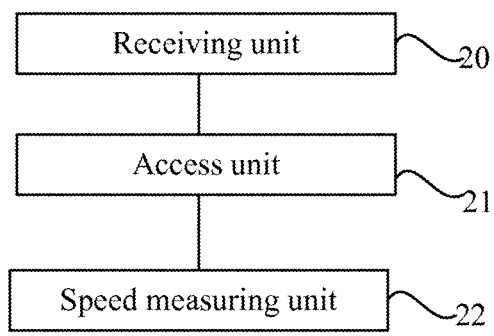
FIG. 10 is a structural block diagram of a UE according to an embodiment of the present invention.

Optionally, in an embodiment of the present invention, as shown in FIG. 10, the UE further includes a speed measuring unit 22, configured to determine a moving speed of the UE.

The access unit 21 is specifically configured to:

select the uplink access port and the downlink access port according to the result of the measurement and the moving speed determined by the speed measuring unit 22; if the moving speed of the UE is greater than a preset speed threshold, select the cell access port as the uplink access port and the downlink access port; and if the moving speed of the UE is not greater than the preset speed threshold, select the uplink access port and the downlink access port according to the result of the measurement.

Specifically, in an embodiment of the present invention, the access threshold information includes a transmission path loss threshold.

The access unit 21 is specifically configured to:

measure the first group of information;

determine, according to the result of the measurement, whether a hot spot access port with a determined transmission path loss being less than its transmission path loss threshold (PL<PLThreshold) exists; and if a hot spot access port with a transmission path loss being less than its transmission path loss threshold exists, select a hot spot access port with a minimum transmission path loss from the hot spot access port with a transmission path loss being less than its transmission path loss threshold as the uplink access port and the downlink access port.

Optionally, if a hot spot access port with a transmission path loss being less than its transmission path loss threshold does not exist, the access unit 21 selects the cell access port as the uplink access port and the downlink access port.

Specifically, in another embodiment of the present invention, the access threshold information includes a transmission path loss threshold and a strength threshold.

The access unit 21 is specifically configured to:

measure the second group of information;

determine, according to the result of the measurement, whether a hot spot access port with a transmission path loss being less than its transmission path loss threshold exists, and whether a hot spot access port with reception strength of a downlink reference signal being greater than its strength threshold exists; and if a hot spot access port with a transmission path loss being less than its transmission path loss threshold and a hot spot access port with reception strength of a downlink reference signal being greater than its strength threshold both exist, select a hot spot access port with a minimum transmission path loss from the hot spot access port with a transmission path loss being less than its transmission path loss threshold as the uplink access port, and select a hot spot access port with maximum reception strength of a downlink reference signal from the hot spot access port with reception strength of a downlink reference signal being greater than its strength threshold as the downlink access port.

Optionally, if a hot spot access port with a transmission path loss being less than its transmission path loss threshold or a hot spot access port with reception strength of a downlink reference signal being greater than its strength threshold does not exist, the access unit 21 selects the cell access port as the uplink access port and the downlink access port.

Optionally, in an embodiment of the present invention, the uplink access port and the downlink access port that are selected by the access unit 21 are a hot spot access port.

The access unit 21 is specifically configured to:

acquire a random access sequence configuration and a physical random access channel configuration of the selected uplink access port from the system information received by the receiving unit 20;

send a random access request by using the random access sequence configuration and the physical random access channel configuration of the selected uplink access port, where transmit power at which the random access request is sent is determined according to a transmission path loss between the UE and the selected uplink access port;

receive a random access response from the selected uplink access port;

send a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receive RRC link configuration information from the selected uplink access port, where the RRC link configuration information includes hot spot access port configuration information, and the hot spot access port configuration information indicates a hot spot access port that serves the UE.

Optionally, in an embodiment of the present invention, the uplink access port and the downlink access port that are selected by the access unit 21 are a hot spot access port.

The access unit 21 is specifically configured to:

acquire a physical random access channel configuration of the selected downlink access port and a random access sequence configuration of the selected uplink access port from the system information received by the receiving unit 20;

send a random access request by using the random access sequence configuration of the selected uplink access port and the physical random access channel configuration of the selected downlink access port, where transmit power at which the random access request is sent is determined according to a transmission path loss between the UE and the selected uplink access port;

receive a random access response from the selected downlink access port;

send a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receive RRC link configuration information from the selected downlink access port, where the RRC link configuration information includes hot spot access port configuration information, and the hot spot access port configuration information indicates a hot spot access port that serves the UE.

Optionally, in an embodiment of the present invention, the uplink access port and the downlink access port that are selected by the access unit 21 are a hot spot access port.

The access unit 21 is specifically configured to:

measure a transmission path loss between the UE and the selected uplink access port according to configuration information, in the system information received by the receiving unit 20, of the selected uplink access port;

acquire a physical random access channel configuration of the selected uplink access port and a random access sequence configuration of the selected downlink access port from the system information;

send a random access request by using the random access sequence configuration of the selected downlink access port and the physical random access channel configuration of the selected uplink access port, where transmit power at which the random access request is sent is determined according to a transmission path loss between the UE and the selected uplink access port;

receive a random access response from the selected downlink access port;

send a radio resource control RRC link setup request, where transmit power at which the RRC link setup request is sent is determined according to the transmission path loss between the UE and the selected uplink access port, an uplink signal that bears the RRC link setup request carries an uplink demodulation reference signal DMRS, the DMRS uses at least one type of configuration information, in the system message, of the selected uplink access port as a sequence initialization parameter, and the at least one type of configuration information is in a one-to-one correspondence with the selected uplink access port; and receive RRC link configuration information from the selected downlink access port, where the RRC link configuration information includes hot spot access port configuration information, and the hot spot access port configuration information indicates a hot spot access port that serves the UE.

Further, in an embodiment of the present invention, the random access response received by the receiving unit 21 may further include uplink and/or downlink access port reset indication information.

If the random access response includes the uplink access port reset indication information, the access unit 21 re-initiates access to the uplink access port that is reset by using the uplink access port reset indication information.

If the random access response includes a downlink access port reset indication, after sending the radio resource control RRC link setup request, the access unit 21 receives RRC link configuration information from the downlink access port that is reset by using the downlink access port reset indication information.

Further, in an embodiment of the present invention, the RRC link setup request sent by the access unit 21 carries hot spot access port selection information, and the hot spot access port selection information indicates a preferred hot spot access port that is determined by the UE and can provide a service for the UE.

It should be noted that, in an embodiment of the network device provided in the present invention, the network device includes a processor and a memory, and units included in the network device are located inside the processor. In an embodiment of the UE provided in the present invention, the UE includes a processor and a memory, and units included in the UE are located inside the processor.

It should be noted that, in the foregoing UE and network device embodiments, the unit division is merely logical function division, but the present invention is not limited to the foregoing division, as long as corresponding functions can be implemented. In addition, specific names of the functional units are merely provided for the purpose of distinguishing the units from each other, but are not intended to limit the protection scope of the present invention.

Functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or a part of the procedures of the method embodiments may be implemented by a computer program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A user equipment that is applied to a heterogeneous network, comprising:

a receiver configured to receive a system message, wherein the system message comprises configuration information for a cell access port of the heterogeneous network and configuration information for at least one hot spot access port group, each of the at least one hot spot access port group comprising at least one hot spot access port of the heterogeneous network, wherein the configuration information for the at least one hot spot access port group comprises list information indicating at least one hot spot access port in a port group and access threshold information for each of the at least one hot spot access port in the port group; and a processor configured to measure a transmission path loss between the user equipment and each of the at least one hot spot access port in the port group according to the system message;

select the cell access port or a hot spot access port as an uplink access port and a downlink access port according to a result of the measurement of the transmission path loss; and access the selected uplink access port and the downlink access port.

2. The user equipment according to claim 1, wherein the configuration information for the at least one hot spot access port group comprises, for each of the at least one hot spot access port group, at least one of the following:

configuration information regarding a random access sequence of a port;

configuration information regarding a physical random access channel of a port; and list information regarding a port in a port group.

3. The user equipment according to claim 1, wherein the processor is configured to:
  acquire a random access sequence configuration and a physical random access channel configuration of the cell access port from the system message received by the receiver;
  send a random access request by using the random access sequence configuration and the physical random access channel configuration of the cell access port;
  receive a random access response from the cell access port;
  send a radio resource control (RRC) link setup request; and
  receive RRC link configuration information from the cell access port, wherein the RRC link configuration information comprises hot spot access port configuration information, and the hot spot access port configuration information indicates a hot spot access port that serves the user equipment.

4. The user equipment according to claim 3, wherein:
  the configuration information for the at least one hot spot access port group comprises list information regarding a port in a port group; and, wherein the processor is further configured to
  measure a transmission path loss between the user equipment and a hot spot access port in the list of the port in the port group according to the system message received by the receiver;
  determine transmission power of the random access request according to a minimum transmission path loss of the measured transmission path loss; and
  send the random access request at the determined transmit power by using the random access sequence configuration and the physical random access channel configuration of the cell access port.

5. The user equipment according to claim 3, wherein the configuration information for the at least one hot spot access port group comprises list information regarding a port in port group; and, wherein the processor is further configured to
  measure a transmission path loss between the user equipment and a hot spot access port in the list of the port in the port group according to the system message received by the receiver; and
  determine transmission power of the RRC link setup request according to a minimum transmission path loss of the measured transmission path loss and to send the RRC link setup request at the determined transmit power.

6. The user equipment according to claim 3, wherein the RRC link setup request sent by the processor carries hot spot access port selection information, wherein the hot spot access port selection information indicates a preferred hot spot access port that is determined by the user equipment and can provide a service for the user equipment.

7. The user equipment according to claim 1, wherein:
  the processor is further configured to
  measure
  reception strength of a downlink reference signal between the user equipment and each of the at least one hot spot access port in the port group; and
  select the uplink access port and the downlink access port further according to a result of the measurement of the reception strength.

8. The user equipment according to claim 7, wherein:
  the access threshold information comprises a transmission path loss threshold and a strength threshold; and, wherein the processor is configured to:
    select a hot spot access port with a minimum transmission path loss from at least one hot spot access port having a transmission path loss less than the transmission path loss threshold as the uplink access port, and
    select a hot spot access port having maximum reception strength of a downlink reference signal from at least one hot spot access port with reception strength of a downlink reference signal being greater than the strength threshold as the downlink access port.

9. The user equipment according to claim 8, wherein the processor is configured to select the cell access port as the uplink access port and the downlink access port when a hot spot access port having a transmission path loss less than the transmission path loss threshold or a hot spot access port with reception strength of a downlink reference signal being greater than the strength threshold does not exist.

10. The user equipment according to claim 1, wherein the processor is further configured to
  determine a moving speed of the user equipment;
  when the moving speed of the user equipment is greater than a preset speed threshold, select the cell access port as the uplink access port and the downlink access port; and
  when the moving speed of the user equipment is not greater than the preset speed threshold, select the uplink access port and the downlink access port according to the result of the measurement.

11. The user equipment according to claim 1, wherein the access threshold information comprises a transmission path loss threshold; and, wherein the processor is configured to:
  select, a hot spot access port having a minimum transmission path loss from at least one hot spot access port having a transmission path loss less than the transmission path loss threshold, as the uplink access port and the downlink access port.

12. The user equipment according to claim 11, wherein the processor is configured to select the cell access port as the uplink access port and the downlink access port when a hot spot access port with a transmission path loss being less than the transmission path loss threshold does not exist.

13. An access method in a heterogeneous network, comprising: receiving, by a user equipment, a system message, wherein the system message comprises configuration information for a cell access port of the heterogeneous network and configuration information for at least one hot spot access port group, each of the at least one hot spot access port group comprising at least one hot spot access port of the heterogeneous network; and measuring, by the user equipment, a transmission path loss between the user equipment and each of the at least one hot spot access port according to the system message; selecting, by the user equipment, the cell access port or a hot spot access port as an uplink access port and a downlink access port according to a result of the measurement of the transmission path loss; accessing, by the user equipment, the selected uplink access port and the downlink access port, and wherein the configuration information for the at least one group of hot spot access port comprises list information regarding at least one hot spot access port in a port group and access threshold information for each of the at least one hot spot access port in the port group for the measurement.

14. The access method according to claim 13, wherein the access threshold information comprises a transmission path loss threshold and a strength threshold, the method further comprises;

selecting a hot spot access port having a minimum transmission path loss from at least one hot spot access port having a transmission path being less than the transmission path loss threshold as the uplink access port, and selecting a hot spot access port having maximum reception strength of a downlink reference signal from at least one hot spot access port with reception strength of a downlink reference signal being greater than the strength threshold as the downlink access port; or selecting the cell access port as the uplink access port and the downlink access port when a hot spot access port with a transmission path loss being less than the transmission path loss threshold or a hot spot access port with reception strength of a downlink reference signal being greater than the strength threshold does not exist.

15. The access method according to claim 13, further comprising: measuring reception strength of a downlink reference signal between the user equipment and each of the at least one hot spot access port in the port group; and, wherein selecting the cell access port or the hot spot access port comprises: selecting the cell access port or the hot spot access port as the uplink access port and the downlink access port further according to a result of the measurement of the reception strength.

16. The access method according to claim 13, wherein the access threshold information comprises a transmission path loss threshold, the method further comprises; selecting, a hot spot access port with a minimum transmission path loss from at least one hot spot access port having a transmission path loss less than the transmission path loss threshold, as the uplink access port and the downlink access port; or selecting the cell access port as the uplink access port and the downlink access port when a hot spot access port having a transmission path loss less than the transmission path loss threshold does not exist.

17. The access method according to claim 13, further comprising:

determining a moving speed of the user equipment; and when the moving speed of the user equipment is greater than a preset speed threshold, select the cell access port as the uplink access port and the downlink access port;

wherein selecting the cell access port or the hot spot access port as the uplink access port and the downlink access port according to the result of the measurement of the transmission path loss comprises:

when the moving speed of the user equipment is not greater than the preset speed threshold, select the uplink access port and the downlink access port according to the result of the measurement of the transmission path loss.

18. A user equipment that is applied to a heterogeneous network, comprising: a receiver configured to receive a system message, wherein the system message comprises configuration information for a cell access port of the heterogeneous network and configuration information for at least one hot spot access port group, each of the at least one hot spot access port group comprising at least one hot spot access port of the heterogeneous network; and a processor configured to:

measure a transmission path loss between the user equipment and each of the at least one hot spot access port according to the system message; select the cell access port or a hot spot access port as an uplink access port and a downlink access port according to a result of the measurement of the transmission path loss; and access the selected uplink access port and the downlink access port, and wherein the configuration information for the at least one group of hot spot access ports comprises list information regarding at least one hot spot access port in a port group and access threshold information for each of the at least one hot spot access port in the port group for the measurement.

* * * * *